United States Patent
Hu et al.

(10) Patent No.: US 11,223,090 B2
(45) Date of Patent: Jan. 11, 2022

(54) POLYMER COMPOSITE MEMBRANE, PREPARATION METHOD THEREOF, AND LITHIUM-ION BATTERY INCLUDING THE SAME

(71) Applicant: BYD COMPANY LIMITED, Shenzhen (CN)

(72) Inventors: Jialing Hu, Shenzhen (CN); Jun Shan, Shenzhen (CN); Gang Hu, Shenzhen (CN); Long He, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 175 days.

(21) Appl. No.: 16/328,993

(22) PCT Filed: Aug. 14, 2017

(86) PCT No.: PCT/CN2017/097406
§ 371 (c)(1),
(2) Date: Feb. 27, 2019

(87) PCT Pub. No.: WO2018/040905
PCT Pub. Date: Mar. 8, 2018

(65) Prior Publication Data
US 2019/0207190 A1   Jul. 4, 2019

(30) Foreign Application Priority Data

Aug. 29, 2016 (CN) .......................... 201610753936.0

(51) Int. Cl.
*H01M 50/449* (2021.01)
*B32B 27/12* (2006.01)
(Continued)

(52) U.S. Cl.
CPC ............. *H01M 50/449* (2021.01); *B32B 7/00* (2013.01); *B32B 7/12* (2013.01); *B32B 9/005* (2013.01);
(Continued)

(58) Field of Classification Search
CPC ........... B32B 7/00; B32B 9/005; B32B 27/00; B32B 2457/10; B32B 7/12; B32B 27/12;
(Continued)

(56) References Cited

U.S. PATENT DOCUMENTS

2009/0246614 A1* 10/2009 Kim ................. H01M 50/411
429/145
2010/0233523 A1   9/2010 Jo et al.
(Continued)

FOREIGN PATENT DOCUMENTS

CN        102569701 A     7/2012
CN        102668173 A     9/2012
(Continued)

OTHER PUBLICATIONS

Melton, George H.; et al., "2—Engineering Thermoplastics", 2011, Applied Plastics Engineering Handbook, p. 15 (Year: 2011).*
(Continued)

*Primary Examiner* — Callie E Shosho
*Assistant Examiner* — Steven A Rice
(74) *Attorney, Agent, or Firm* — Anova Law Group, PLLC

(57) ABSTRACT

The disclosure provides a polymer composite membrane, a method for preparing same, and a lithium-ion battery including same. The polymer composite membrane includes a polymer base membrane, where the polymer base membrane includes a first surface and a second surface disposed opposite to each other, and the polymer composite membrane further includes a first ceramic layer, a first heat-
(Continued)

resistant fiber layer, and a first bonding layer disposed sequentially from inside out on the first surface of the polymer base membrane, where materials of the first heat-resistant fiber layer contain a first polymeric material and a second polymeric material.

14 Claims, 1 Drawing Sheet

(51) Int. Cl.
    *B32B 9/00*          (2006.01)
    *B32B 7/12*          (2006.01)
    *B32B 7/00*          (2019.01)
    *H01M 50/44*       (2021.01)
    *H01M 50/411*      (2021.01)
    *H01M 50/431*      (2021.01)
    *H01M 50/46*       (2021.01)
    *B32B 27/00*       (2006.01)
    *H01M 10/052*      (2010.01)
    *H01M 50/403*      (2021.01)
    *H01M 10/0525*     (2010.01)

(52) U.S. Cl.
    CPC ........... *B32B 27/12* (2013.01); *H01M 10/052* (2013.01); *H01M 50/403* (2021.01); *H01M 50/411* (2021.01); *H01M 50/431* (2021.01); *H01M 50/44* (2021.01); *H01M 50/461* (2021.01); *B32B 27/00* (2013.01); *B32B 2457/10* (2013.01); *H01M 10/0525* (2013.01)

(58) Field of Classification Search
    CPC .. H01M 50/449; H01M 50/44; H01M 50/461; H01M 50/431; H01M 50/411
    USPC ........................................................ 442/149
    See application file for complete search history.

(56) References Cited

U.S. PATENT DOCUMENTS

| | | | |
|---|---|---|---|
| 2012/0225358 A1* | 9/2012 | Seo | H01M 50/403 429/246 |
| 2014/0329131 A1* | 11/2014 | Jo | B29C 48/142 429/145 |
| 2015/0162588 A1* | 6/2015 | Lee | H01M 2/1653 429/145 |
| 2019/0237732 A1* | 8/2019 | Hu | H01M 10/0525 |

FOREIGN PATENT DOCUMENTS

| | | |
|---|---|---|
| CN | 103343423 A | 10/2013 |
| CN | 104051687 A | 9/2014 |
| CN | 104584269 A | 4/2015 |
| CN | 104681764 A | 6/2015 |
| CN | 104835931 A | 8/2015 |
| CN | 105304847 A | 2/2016 |
| CN | 105470435 A | 4/2016 |
| CN | 105895844 A | 8/2016 |
| CN | 206210903 U | 5/2017 |
| WO | 2013115594 A1 | 8/2013 |
| WO | 2014142450 A1 | 9/2014 |

OTHER PUBLICATIONS

Machine translation of CN 102569701 A (Year: 2012).*
Polymer Database, "Poly(propyl acrylate)", Apr. 23, 2015, p. 2 (Year: 2015).*
The World Intellectual Property Organization (WIPO) International Search Report for PCT/CN2017/097406 dated Oct. 27, 2017 6 Pages.

* cited by examiner

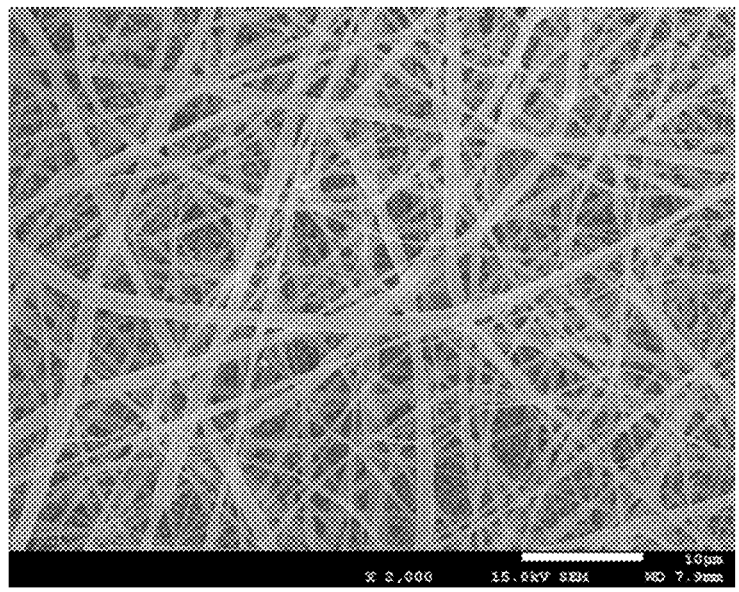

POLYMER COMPOSITE MEMBRANE, PREPARATION METHOD THEREOF, AND LITHIUM-ION BATTERY INCLUDING THE SAME

CROSS-REFERENCE TO RELATED APPLICATIONS

This application is a national phase entry under 35 U.S.C. § 371 of International Application No. PCT/CN2017/097406, filed on Aug. 14, 2017, which claims priority to and benefits of Chinese Patent Application No. 201610753936.0, filed with the State Intellectual Property Office of P. R. China on Aug. 29, 2016. The entire content of all of the above-referenced applications is incorporated herein by reference.

FIELD

The disclosure relates to the field of lithium-ion batteries and, specifically, to a polymer composite membrane and a preparation method for the same. The disclosure further includes a lithium-ion battery in which the foregoing polymer composite membrane is used.

BACKGROUND

A lithium-ion battery is mainly formed by a positive/negative electrode material, an electrolyte, a membrane, and a battery case packaging material. The membrane is an important component of the lithium-ion battery, and is configured to play a role of separating positive and negative electrodes, to prevent the battery from being internally short-circuited; and allowing ions of the electrolyte to pass freely, to complete an electrochemical charge/discharge process. The performance of the membrane determines the interface structure, the internal resistance, and the like of the battery, and directly affects characteristics of the battery such as the rate performance, the cycle performance, and the safety performance (the high-temperature resistance performance). A membrane whose performance is excellent plays an important role of improving the comprehensive performance of a battery, and is referred to as a "third electrode" of the battery in the industry.

Conventional membrane preparation methods mainly include two main types: a "melt-spinning and cold-stretching method" and a "thermally induced phase separation method", where the preparation principle of the "melt-spinning and cold-stretching method" is: crystallizing a polymer melt such as polyolefin in a high stress field, forming a structure having lamellar crystals arranged in parallel and perpendicular to an extrusion direction, and then obtaining a hard-elastic material through heat treatment. After a hard-elastic polymer membrane is stretched, the lamellar crystals are separated from each other, and a large quantity of microfibers appear. Therefore, a large quantity of microporous structures are formed, and then a microporous membrane is manufactured through heat setting. The "thermally induced phase separation method" is a method for preparing a microporous membrane developed in recent years. In the method, a high polymer such as polyolefin and some small molecule compounds having high boiling points are used to form a homogeneous solution at a relatively high temperature (which is usually higher than the melting temperature Tm of the polymer), and solid-liquid or liquid-liquid phase separation occurs when the temperature is reduced. In this way, an additive phase is contained in a polymer-rich phase, and a polymer phase is contained in an additive-rich phase. After the stretching, if low molecular polymers are removed, microporous membrane materials in communication with each other may be made.

However, for a membrane prepared by using the "melt-spinning and cold-stretching method", although the costs are relatively low and the mechanical strength (toughness and strength) is relatively good, the high-temperature resistance stability (thermal shrinkage) is poor; and for a membrane prepared by using the "thermally induced phase separation method", although the high-temperature resistance stability is improved, the costs are relatively high, and the mechanical strength of the material is deteriorated (hardened), which limits development of the material in the battery field.

The research and development personnel is always seeking a manner that can give consideration to both the toughness and the high-temperature resistance stability of the membrane, so as to adapt to rapid development of the battery industry.

SUMMARY

An objective of the disclosure is to provide a polymer composite membrane, a method for preparing same, and a lithium-ion battery including same, so as to improve the high-temperature resistance stability of the polymer composite membrane.

To achieve the foregoing objective, according to a first aspect of the disclosure, a polymer composite membrane is provided, where the polymer composite membrane includes a polymer base membrane, where the polymer base membrane includes a first surface and a second surface disposed opposite to each other, and the polymer composite membrane further includes a first ceramic layer, a first heat-resistant fiber layer, and a first bonding layer disposed sequentially from inside out on the first surface of the polymer base membrane, where materials of the first heat-resistant fiber layer contain a first polymeric material and a second polymeric material; the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

According to a second aspect of the disclosure, a method for preparing a polymer composite membrane is provided, where the preparation method includes the following steps: S1: providing a polymer base membrane, where the polymer base membrane includes a first surface and a second surface disposed opposite to each other; S2: forming a first ceramic layer on the first surface of the polymer base membrane; S3: preparing a spinning solution containing a first polymeric material and a second polymeric material, and forming a first heat-resistant fiber layer on a surface of the first ceramic layer through electrostatic spinning by using the spinning solution; and S4: forming a first bonding layer on a surface of the first heat-resistant fiber layer, where the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

According to a third aspect of the disclosure, a lithium-ion battery is provided, where the lithium-ion battery includes a positive electrode, a negative electrode, and a battery membrane located between the positive electrode and the negative electrode, and the battery membrane is the polymer composite membrane described in the disclosure.

Application of the polymer composite membrane, the method for preparing same, and the lithium-ion battery including same of the disclosure has the following beneficial effects:

(1) The heat-resistant polymeric material is used as the first polymeric material, to facilitate improvement in the high-temperature resistance performance (transverse/longitudinal thermal shrinkage percentage) of the polymer composite membrane, so that thermal shrinkage of the polymer composite membrane at a high temperature (180° C.) is relatively small, to further facilitate avoidance of contact between the positive and negative electrodes caused by shrinkage of the polymer composite membrane because the battery is heated (for example, caused by tiny short-circuit) cause, thereby ensuring the safety performance of the battery.

(2) The second polymeric material whose liquid absorption rate in an electrolyte at 25° C. is above 40% is used, and a characteristic in which the second polymeric material can perform liquid absorption and swelling in the electrolyte and is partially gelatinized is used, so that the gelatinized second polymeric material has a particular viscosity, to further facilitate enhancement in compatibility between the first heat-resistant fiber layer and the first ceramic layer, and/or between the first heat-resistant fiber layer and an outer layer structure (the first bonding layer or the positive and negative electrodes) and enhancement in a binding force between the first heat-resistant fiber layer and the first ceramic layer, and/or between the first heat-resistant fiber layer and an outer layer structure (the first bonding layer or the positive and negative electrodes), and facilitate improvement in the mechanical performance of the prepared polymer composite membrane at a high temperature.

(3) Both the first polymeric material and the second polymeric material are used, and a characteristic in which the first polymeric material has a relatively high melting point (above 180° C.) and can keep a relatively good strength at a high temperature is used, so that the first polymeric material becomes a backbone of an entire spinning fiber network structure; and the characteristic in which the second polymeric material (whose liquid absorption rate in an electrolyte at 25° C. is above 40%) can perform liquid absorption and swelling in the electrolyte and is partially gelatinized is used, so that the gelatinized second polymeric material has a particular viscosity, and then is attached to the backbone of the spinning fiber network structure formed by the first polymeric material, to play a particular role of enhancing the backbone of the spinning fiber network structure, and then improve the mechanical strength (the transverse stretching strength, the longitudinal stretching strength, and the needling strength) of the first heat-resistant fiber layer and the polymer composite membrane.

(4) The first heat-resistant fiber layer is formed by using the first polymeric material and the second polymeric material, and this first heat-resistant fiber layer has a spinning fiber network structure, so that a substance layer (relatively thin) generated when the second polymeric material is gelatinized is attached to a surface of the first polymeric material, and therefore does not hinder migration of lithium ions, to facilitate maintenance in the ion conductivity of the polymer composite membrane, and then improve the performance of the battery such as the cycle life to a particular extent.

Other features and advantages of the disclosure are described in detail in the subsequent specific implementations.

BRIEF DESCRIPTION OF THE DRAWINGS

The accompanying drawing is used to further understand the disclosure and constitute a part of the specification, and is used to explain the disclosure together with the following specific implementations, but does not constitute a limitation on the disclosure. In the accompanying drawing:

FIG. 1 shows a SEM picture of a polymer composite membrane F1 obtained according to Embodiment 1 of the disclosure, where a magnification factor is 2000.

DETAILED DESCRIPTION

Specific implementations of the disclosure are described in detail below. It should be understood that, the specific implementations described herein are used to only describe and explain the disclosure, but are not used to limit the disclosure.

Endpoints of all ranges and all values disclosed in the disclosure are not limited to the precise ranges or values, and these ranges or values should be understood as including values close to these ranges or values. For value ranges, endpoint values of the ranges, an endpoint value of each range and an independent point value, and independent point values may be combined with each other to obtain one or more new value ranges, and these value ranges should be considered as being specifically disclosed herein.

The disclosure provides a polymer composite membrane, where the polymer composite membrane includes a polymer base membrane, where the polymer base membrane includes a first surface and a second surface disposed opposite to each other, and the polymer composite membrane further includes a first ceramic layer, a first heat-resistant fiber layer, and a first bonding layer disposed sequentially from inside out on the first surface of the polymer base membrane, where materials of the first heat-resistant fiber layer contain a first polymeric material and a second polymeric material; the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and is optionally 40% to 100% and has an error of ±5%. In the disclosure, the error being ±5% herein means an error existing when the liquid absorption rate of the second polymeric material is measured.

In the disclosure, a method for measuring a "liquid absorption rate" includes: dissolving a to-be-measured material in a corresponding solvent, performing pouring to form a sample having a designated size (for example, a wafer whose diameter is 17 mm), performing drying, then weighing the sample of a mass m1 in a glove box (at 25° C.) full of argon, then immersing the sample in an electrolyte (the electrolyte contains a lithium salt $LiPF_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference) for 24 h, then taking out the sample, drying the liquid on the surface of the sample by using filter paper (not performing pressing processing), weighing the sample of a mass m2, and then calculating a corresponding liquid absorption rate according to a calculation formula: "liquid absorption rate=(m2−m1)/m1× 100%". In a process of measuring a liquid absorption rate, different operators may have different operation manners for the step of "drying the liquid on the surface of the sample by using the filter paper". This affect may a measurement result, and in the disclosure, an allowable measurement error is ±5%.

According to the polymer composite membrane of the disclosure in an implementation, a liquid absorption rate of the first polymeric material in an electrolyte at 25° C. is below 5% and has an error of ±5%. By controlling the liquid absorption rate of the first polymeric material, it is favorable to better keep the backbone of the spinning fiber network structure formed by the first polymeric material at a high temperature, and optimize heat-resistant stability (heat-resistant safety) of the prepared polymer composite membrane.

According to the polymer composite membrane of the disclosure in an implementation, the glass transition temperature of the first polymeric material is above 100° C. By selecting the first polymeric material whose glass transition temperature is above 100° C., it is favorable for the prepared polymer composite membrane to keep a relatively high strength in a temperature increasing process (from a room temperature to 100° C.), so that the second polymeric material that can perform liquid absorption and swelling in the electrolyte and is partially gelatinized can be better bonded onto the backbone of the spinning fiber network structure formed by the first polymeric material, to further optimize heat-resistant stability of the prepared polymer composite membrane.

According to the polymer composite membrane of the disclosure in an implementation, the first polymeric material includes but is not limited to one or more of polyetherimide (PEI), poly (ether ether ketone) (PEEK), polyether sulfone (PES), polyamide-imide (PAI), polyamide acid (PAA), and polyvinylpyrrolidone (PVP). The poly(ether ether ketone) (PEEK) includes copoly(ether ether ketone) (CoPEEK) and modified poly(ether ether ketone), provided that the melting point of the poly(ether ether ketone) satisfies the foregoing requirement.

Specifically, the first polymeric material that may be used includes but is not limited to one or more of ultem 1000 (which has a glass transition temperature of 215° C. and a liquid absorption rate of 0.1% in an electrolyte at 25° C.) commercially available from SABIC Innovative Plastics (Shanghai) Co., Ltd., a polyvinylpyrrolidone product (which has a glass transition temperature of 110° C. to 130° C. and a liquid absorption rate of 1% in an electrolyte at 25° C.) with a trade mark K90 commercially available from Hangzhou Sunflower Technology Development Co., Ltd., and a poly(ether ether ketone) product (which has a glass transition temperature of 143° C. and a liquid absorption rate of 0.5% in an electrolyte at 25° C.) with a trade mark ketaspire commercially available from Solvay Corporation.

According to the polymer composite membrane of the disclosure in an implementation, the melting point of the second polymeric material is 100° C. to 150° C.; and the glass transition temperature of the second polymeric material is below 25° C. By selecting the second polymeric material whose glass transition temperature is relatively low, at a normal use temperature (a room temperature to 40° C.) of a battery, the second polymeric material is already softened, and is bonded onto the backbone of the spinning fiber network structure formed by the first polymeric material, to further optimize heat-resistant stability of the prepared polymer composite membrane. In an implementation, optionally, the second polymeric material includes but is not limited to one or more of modified polyvinylidene fluoride (PVDF), polyacrylate, polyphenyl ethylene, and polyethylene oxide (PEO).

It should be noted that, in the disclosure, the foregoing types of raw materials (modified polyvinylidene fluoride, polyacrylate, polyphenyl ethylene, and polyethylene oxide) may be used as the second polymeric material, but a precondition is that the used raw material needs to satisfy the requirement of the disclosure for the liquid absorption rate of the second polymeric material. Using polyvinylidene fluoride as an example, the liquid absorption rate of unmodified polyvinylidene fluoride is usually 20% to 25%, and does not conform to the use requirement of the disclosure, and modified polyvinylidene fluoride such as polyvinylidene fluoride-hexafluoropropylene (PVDF-HFP) that is modified so that the liquid absorption rate satisfies the foregoing requirement is selected in the disclosure; and using polyacrylate as an example, polyacrylate whose liquid absorption rate satisfies the foregoing requirement includes but is not limited to polymethyl acrylate, polymethyl methacrylate, and polyethylene acrylate.

Specifically, the second polymeric material that may be used includes but is not limited to one or more of a PVDF-HFP product (which has a glass transition temperature of −55° C. to −40° C. and a liquid absorption rate of 45% to 60% in an electrolyte at 25° C.) with a trade mark LBG commercially available from Arkema Corporation, a polyethylene oxide product (which has a glass transition temperature of −65° C. and a liquid absorption rate of 1000% in an electrolyte at 25° C., where Mw=600000) commercially available from Aladdin Corporation, and a polymethyl methacrylate product (which has a liquid absorption rate of 55% in an electrolyte at 25° C.) commercially available from Aladdin Corporation. Optionally, a liquid absorption rate of the second polymeric material in an electrolyte at 25° C. is 40% to 100% and has an error of ±5%.

According to the polymer composite membrane of the disclosure selection for a material in the first heat-resistant fiber layer is not limited. Based on use of both the first polymeric material and the second polymeric material, other raw materials such as nanometer ceramic particles may be further properly added with reference to a regular material use requirement in the field. Certainly, in the disclosure, the materials of the first heat-resistant fiber layer may be formed by a mixture of the first polymeric material and the second polymeric material. By using the mixture of the first polymeric material and the second polymeric material to prepare the first heat-resistant fiber layer of the polymer composite membrane of the disclosure, the effect that the disclosure intends to achieve can be achieved relatively well.

According to the polymer composite membrane of the disclosure a weight ratio of the first polymeric material to the second polymeric material in the first heat-resistant fiber layer may be random, provided that based on using the particular first polymeric material as a main raw material, the objective of the disclosure can be achieved to a particular extent by adding some second polymeric material. However, in comprehensive consideration of temperature resistant stability, strength, and toughness of the entire polymer composite membrane, in the disclosure, a weight ratio of the first polymeric material to the second polymeric material in the first heat-resistant fiber layer is (0.5 to 10):1, or a weight ratio of the first polymeric material to the second polymeric material in the first heat-resistant fiber layer is (1 to 5):1, or a weight ratio of the first polymeric material to the second polymeric material in the first heat-resistant fiber layer is (1 to 3): 1.

According to the polymer composite membrane of the disclosure in an implementation, in the materials of the heat-resistant fiber layer, the first polymeric material is polyetherimide, and the second polymeric material is polyvinylidene fluoride-hexafluoropropylene; and further optionally, the materials of the heat-resistant fiber layer are a mixture of polyetherimide and polyvinylidene fluoride-hexafluoropropylene. Polyetherimide is characterized in that polyetherimide can keep a relatively good strength at a high temperature, so that polyetherimide becomes the backbone of the entire spinning fiber network structure, and polyvinylidene fluoride-hexafluoropropylene can perform liquid absorption and swelling in an electrolyte, and has a gelatinization characteristic and therefore has bonding performance to some extent, and then can be quite well attached to the backbone of the spinning fiber network structure formed by polyetherimide, thereby playing a role of enhancing on the backbone of the spinning fiber network structure, and further improving the mechanical strength of a first heat-resistant fiber layer and the polymer composite membrane.

According to the polymer composite membrane of the disclosure in an implementation, in the foregoing polymer composite membrane, the porosity of the first heat-resistant fiber layer is above 70%, and optionally the porosity of the heat-resistant fiber layer is 70% to 95%, and is optionally 75% to 95%. The porosity of the first heat-resistant fiber layer is high, so that the ion conductivity of the polymer composite membrane may be effectively ensured. In the disclosure, a manner of measuring the porosity of the first heat-resistant fiber layer is: preparing a first heat-resistant fiber layer sample of a particular size, weighing, then immersing the first heat-resistant fiber layer sample in isobutanol, measuring the weight of the sample after adsorption and balancing, and then calculating the porosity of the first heat-resistant fiber layer by using a formula:

$$\frac{\text{Mass after adsorption} - \text{Mass before adsorption}}{\rho_{isobutanol}\text{Sample volume}} \times 100\%.$$

According to the polymer composite membrane of the disclosure in an implementation, the surface density of the first heat-resistant fiber layer is 0.2 g/m$^2$ to 15 g/m$^2$, for example, 3 g/m$^2$ to 6 g/m$^2$. The surface density of the first heat-resistant fiber layer is the mass of a substance applied onto a base material membrane on a unit area. In the disclosure, when the surface density of the first heat-resistant fiber layer falls within the foregoing range, the conductivity may be effectively ensured without affecting migration of lithium ions, and better bonding performance is provided, to facilitate improvement in the safety performance of the battery.

According to the polymer composite membrane of the disclosure the thickness of the first heat-resistant fiber layer and the diameter of fiber in the heat-resistant fiber layer are not specially limited, and in an implementation, the single-sided thickness of the first heat-resistant fiber layer is 0.5 μm to 30 μm, and is optionally 0.5 μm to 10 μm, for example, 1 μm to 5 μm; and In an implementation, the diameter of the fiber is 100 nm to 2000 nm. In the disclosure, when the thickness of the first heat-resistant fiber layer falls within the foregoing range, the positive and negative electrodes and the membrane may be effectively bonded, thereby improving the cycle performance of the battery.

According to the polymer composite membrane of the disclosure a polyolefin membrane generally used for a lithium-ion battery may be used as the polymer base membrane, for example, includes but is not limited to a polypropylene (PP) membrane, a polyethylene (PE) membrane, and a PE/PP/PE three-layered membrane.

According to the polymer composite membrane of the disclosure no special requirement is imposed on the first ceramic layer in the polymer composite membrane, and a regularly used ceramic layer in the field may be selected. However, the inventor of the disclosure finds through in-depth research that, in the prior art, a ceramic layer is usually intentionally or unintentionally fabricated to have low density and high porosity. In this way, the air permeability of the ceramic membrane (which includes a polymer base membrane and a ceramic layer attached onto at least one side surface of the polymer base membrane) may be greatly increased, but it is difficult for such a ceramic membrane to be high-temperature resistant, and obvious thermal shrinkage usually occurs in the ceramic membrane above 160° C. to affect the safety performance of the battery. Moreover, it is mentioned in CN105355825A that the surface density of a ceramic layer may be controlled to be between 0.2 mg/cm$^2$ and 1.8 mg/cm$^2$ to improve the pressure resistant performance and the ion permeation performance of the ceramic layer, but a thickness factor is not eliminated for the surface density, that is, the surface density of the ceramic layer may be increased because the ceramic layer is thicken but not because the ceramic layer is accumulated more densely. Such an increase in the surface density may improve the safety by improving the thermal resistance of the ceramic membrane, but the high-temperature resistance and shrinkage resistance performance of the ceramic membrane is not ideal, and the increase in the thickness unfavorably affects the capacity of the battery.

Further, according to the present disclosure, when the surface density p of the first ceramic layer at a unit thickness (1 μm) is controlled to be 1.8 mg/cm$^2$<ρ≤2.7 mg/cm$^2$, the corresponding ceramic membrane has quite excellent high-temperature resistance and thermal-shrinkage resistance performance. Based on this, in the disclosure, optionally the first ceramic layer contains ceramic particles and a binder, and the surface density p of the first ceramic layer at a unit thickness (1 μm) satisfies 1.8 mg/cm$^2$<ρ≤2.7 mg/cm$^2$, and optionally satisfies 1.85 mg/cm$^2$≤ρ≤2.65 mg/cm$^2$, for example, satisfies 1.9 mg/cm$^2$≤ρ≤2.6 mg/cm$^2$.

In the method for preparing a first ceramic layer provided in the disclosure, optimized dispersion of ceramic particles is implemented by controlling the use amount of each component in the first ceramic layer slurry, the number-average molecular weight of the dispersant, and the rotational speed for forming the first ceramic layer slurry, thereby controlling the density of accumulation between the ceramic particles to control the surface density of the first ceramic layer at a unit thickness (1 μm) to be 1.8 mg/cm$^2$<ρ≤2.7 mg/cm$^2$. In this way, the high-temperature resistance and thermal-shrinkage resistance performance of the ceramic membrane can be improved on the basis of basically not reducing the air permeability, so that the heat-resistant temperature of the ceramic membrane is above 160° C., that is, the thermal stability of the ceramic membrane is improved without increasing the thickness of the first ceramic layer, so as not to affect the energy density of the battery.

According to the polymer composite membrane of the disclosure in an implementation, in the first ceramic layer, relative to the ceramic particles of 100 parts by weight, the content of the binder is 2 to 8 parts by weight, for example, 4 to 6 parts by weight. When the content of each substance in the first ceramic layer is controlled to be within the foregoing optional range, the obtained ceramic membrane is enabled to have better high-temperature resistance and thermal-shrinkage resistance performance and air permeability.

According to the polymer composite membrane of the disclosure the type of the ceramic particles may be regularly selected in the field, for example, may be selected from one or more of $Al_2O_3$, $SiO_2$, $BaSO_4$, $BaO$, $TiO_2$, $CuO$, $MgO$, $Mg(OH)_2$, $LiAlO_2$, $ZrO_2$, CNT, BN, SiC, $Si_3N_4$, WC, BC, AlN, $Fe_2O_3$, $BaTiO_3$, $MoS_2$, $\alpha$-$V_2O_5$, $PbTiO_3$, $TiB_2$, $CaSiO_3$, molecular sieve, clay, boehmite, and kaolin. Moreover, an average particle size of the ceramic particle is optionally 200 nm to 800 nm, for example, 300 nm to 600 nm, thereby not only facilitating avoidance of coagulation of the slurry used for the first ceramic layer, but also facilitating improvement in the air permeability of the ceramic membrane.

According to the polymer composite membrane of the disclosure the type of the binder is not particularly limited, and the binder may be various existing substance that can be used to improve the strength of the ceramic membrane, for example, may be at least one of polyacrylate (an optional weight-average molecular weight $M_w$ is $1\times10^4$ g/mol to $1\times10^6$ g/mol), a copolymer of polyvinylidene fluoride and hexafluoropropylene (an optional weight-average molecular weight $M_w$ is $1\times10^4$ g/mol to $1\times10^6$ g/mol), a copolymer of polyvinylidene fluoride and trichloro ethylene (an optional weight-average molecular weight $M_w$ is $1\times10^4$ g/mol to $1\times10^6$ g/mol), polyacrylonitrile (an optional weight-average molecular weight $M_w$ is $1\times10^4$ g/mol to $1\times10^6$ g/mol), polyvinyl pyrrolidone (an optional weight-average molecular weight $M_w$ is $1\times10^5$ g/mol to $1\times10^6$ g/mol), polyimide (an optional weight-average molecular weight $M_w$ is $1\times10^4$ g/mol to $1\times10^6$ g/mol), polyvinyl alcohol (an optional weight-average molecular weight $M_w$ is $1\times10^3$ g/mol to $1\times10^5$ g/mol), and the like, and is optionally polyacrylate, for example, polyacrylate whose glass transition temperature satisfies $-40°$ C. to $0°$ C. The polyacrylate whose glass transition temperature satisfies $-40°$ C. to $0°$ C. may be specifically at least one of a homopolymer, a copolymer, and the like of methylmethacylate, ethylmethacrylate, butylmethacrylate, and hexylmethacrylate. When the polyacrylate whose glass transition temperature satisfies $-40°$ C. to $0°$ C. is used as the binder, the manufacturing performance of the ceramic membrane can be improved without affecting the bonding strength of the ceramic membrane, to have a better industrial application prospect. Moreover, a crosslinked monomer such as methyl methacrylate and/or methylolacrylamide is introduced into the foregoing polyacrylate binder, and the content of the crosslinked monomer is optionally controlled to be within 8 wt %, for example, controlled to be 3 wt % to 5 wt %. In this way, the polyacrylate binder may be mildly crosslinked, thereby improving the water resistance of the ceramic membrane and increasing the bonding strength of the first ceramic layer.

According to the polymer composite membrane of the disclosure in an implementation, in the first ceramic layer, relative to the ceramic particles of 100 parts by weight, a binder of 2 to 8 parts by weight, a dispersant of 0.3 to 1 part by weight, a thickener of 0.5 to 1.8 parts by weight, and a surface treating agent of 0 to 1.5 parts by weight are further included, and the number-average molecular weight of the dispersant is below 50000; optionally, in the first ceramic layer, relative to the ceramic particles of 100 parts by weight, the use amount of the binder is 4 to 6 parts by weight, the use amount of the dispersant is 0.4 to 0.8 part by weight, the use amount of the thickener is 0.7 to 1.5 parts by weight, and the use amount of the surface treating agent is 0 to 1.5 parts by weight, and the number-average molecular weight of the dispersant is 5000 g/mol to 20000 g/mol.

According to the polymer composite membrane of the disclosure the type of the dispersant in the first ceramic layer is not particularly limited, and the dispersant may be various existing substances that are helpful to dispersion of each substance in the first ceramic layer slurry and whose number-average molecular weight is below 50000, is optionally at least one of polyacrylate, polyglycol ether, silicates, phosphates, and guar gum, and is optionally at least one of polyacrylate, aliphatic polyglycol ether, and phosphates. The polyacrylate may be, for example, at least one of potassium polyacrylate, sodium polyacrylate, lithium polyacrylate, and the like. The aliphatic polyglycol ether may be, for example, polyethylene glycol tert-octylphenyl ether and/or polyethylene glycol monooleyl ether. The phosphates may be, for example, sodium tripolyphosphate and/or sodium hexametaphosphate.

According to the polymer composite membrane of the disclosure the type of the thickener in the first ceramic layer is not particularly limited, and the thickener is optionally at least one of polyacrylate, a polyacrylate copolymer, polyvinylpyrrolidone, a cellulose derivative, and polyacrylamide, and is optionally at least one of polyacrylate, a polyacrylate copolymer, and a cellulose derivative. The polyacrylate may be, for example, at least one of potassium polyacrylate, sodium polyacrylate, lithium polyacrylate, and the like. The polyacrylate copolymer may be, for example, at least one of a copolymer of acrylic acid and styrene, a copolymer of acrylic acid and ethyl acrylate, a copolymer of acrylic acid and ethylene, and the like. The cellulose derivative may be, for example, at least one of sodium carboxymethylcellulose, potassium carboxymethylcellulose, hydroxyethyl cellulose, and the like. Moreover, the viscosity of the thickener in an aqueous solution of 1 wt % is 1500 mPa·s to 7000 mPa·s. In this way, the thickener not only can be quite well dispersed in the first ceramic layer slurry, but also can be favorable to applying, and more favorable to improvement in the surface density. Moreover, each of the dispersant and the thickener may be polyacrylate, but, the number-average molecular weight of polyacrylate used as the thickener is far greater than the molecular weight of polyacrylate used as the dispersant, the number-average molecular weight of the polyacrylate used as the thickener is usually 300000 to 1500000, and the number-average molecular weight of the polyacrylate used as the dispersant is below 50000.

According to the polymer composite membrane of the disclosure the type of the surface treating agent in the first ceramic layer is not particularly limited, and the surface treating agent is 3-glycidyloxypropyltrimethoxysilane and/or 3-glycidyloxypropyltriethoxysilane. In this way, interaction between the ceramic particles and the binder can be further improved, to enhance the strength of the ceramic membrane.

According to the polymer composite membrane of the disclosure in an implementation, the thickness of the polymer base membrane in the ceramic membrane is 5 μm to 30 μm, for example, 6 μm to 25 μm. Moreover, the single-sided thickness of the first ceramic layer is optionally 1 μm to 5

μm, for example, 2 μm to 3.5 μm, so as to be more favorable to improvement in the high-temperature resistance and thermal-shrinkage resistance performance of the ceramic membrane and improvement in the air permeability.

According to the polymer composite membrane of the disclosure no special requirement is imposed on the first ceramic layer in the polymer composite membrane, and a regularly used ceramic layer in the field may be selected. Disposition of the first bonding layer can improve the viscosity between the polymer composite membrane and the positive and negative electrodes, increase the disposition stability of the polymer composite membrane, and improve the safety performance of the battery. In an implementation, the first bonding layer contains an acrylate crosslinked polymer and a styrene-acrylate crosslinked copolymer and/or a vinylidene fluoride-hexafluoropropylene copolymer, what means, the first bonding layer contains an acrylate crosslinked polymer and a styrene-acrylate crosslinked copolymer, or the first bonding layer contains an acrylate crosslinked polymer, a styrene-acrylate crosslinked copolymer and a vinylidene fluoride-hexafluoropropylene copolymer, or the first bonding layer contains an acrylate crosslinked polymer and a vinylidene fluoride-hexafluoropropylene copolymer, and the porosity of the first bonding layer is 40% to 65%. When the ceramic membrane further includes the foregoing particular first bonding layer, the ceramic membrane not only has good high-temperature resistance and thermal-shrinkage resistance performance, but also has higher bonding strength and ion conductivity.

That "the first bonding layer contains an acrylate crosslinked polymer and a styrene-acrylate crosslinked copolymer and/or a vinylidene fluoride-hexafluoropropylene copolymer" means that the bonding layer contains an acrylate crosslinked polymer and a styrene-acrylate crosslinked copolymer and does not contain a vinylidene fluoride-hexafluoropropylene copolymer, or contains an acrylate crosslinked polymer and a vinylidene fluoride-hexafluoropropylene copolymer and does not contain a styrene-acrylate crosslinked copolymer, or contains an acrylate crosslinked polymer, a styrene-acrylate crosslinked copolymer, and a vinylidene fluoride-hexafluoropropylene copolymer. Moreover, "containing a self-crosslinking pure acrylic emulsion and a self-crosslinking styrene acrylic emulsion and/or a copolymer emulsion of vinylidene fluoride and hexafluoropropylene" may also be similarly explained.

According to the polymer composite membrane of the disclosure the acrylate crosslinked polymer is a polymer obtained by performing cross-linking polymerization on reaction-type acrylate monomers. The crosslinking degree of the acrylate crosslinked polymer may be 2% to 30%, and is optionally 5% to 20%. In the disclosure, the crosslinking degree is the percentage of the weight of the crosslinked polymer to the total weight of the polymer. Moreover, the glass transition temperature of the acrylate crosslinked polymer is optionally $-20°$ C. to $60°$ C., for example, $-12°$ C. to $54°$ C. According to an implementation of the disclosure, the acrylate crosslinked polymer is a mixture of a first acrylate crosslinked polymer and a second acrylate crosslinked polymer and/or a third acrylate crosslinked polymer, or a second acrylate crosslinked polymer, or a third acrylate crosslinked polymer, what means, the acrylate crosslinked polymer is a mixture of a first acrylate crosslinked polymer, a second acrylate crosslinked polymer and a third acrylate crosslinked polymer, or the acrylate crosslinked polymer is a mixture of a first acrylate crosslinked polymer and a second acrylate crosslinked polymer, or the acrylate crosslinked polymer is a mixture of a first acrylate crosslinked polymer and a third acrylate crosslinked polymer, or the acrylate crosslinked polymer is a second acrylate crosslinked polymer, or the acrylate crosslinked polymer is a third acrylate crosslinked polymer, where the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the glass transition temperature of the first acrylate crosslinked polymer is $50°$ C. to $60°$ C., the glass transition temperature of the second acrylate crosslinked polymer is $-20°$ C. to $-5°$ C., and the glass transition temperature of the third acrylate crosslinked polymer is $30°$ C. to $50°$ C.

According to the polymer composite membrane of the disclosure the styrene-acrylate crosslinked copolymer is a copolymer obtained by copolymerizing a styrene monomer and a reaction-type acrylate monomer. A weight ratio of a styrene structure unit to an acrylate structure unit in the styrene-acrylate crosslinked copolymer may be (0.5 to 2):1, and is optionally (0.67 to 1.5):1. The crosslinking degree of the styrene-acrylate crosslinked copolymer may be 2% to 30%, and is optionally 5% to 20%. Moreover, the glass transition temperature of the styrene-acrylate crosslinked copolymer is optionally $-30°$ C. to $50°$ C., for example, $-20°$ C. to $50°$ C. According to an implementation of the disclosure, the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; and the glass transition temperature of the styrene-acrylate crosslinked copolymer is $15°$ C. to $30°$ C.

According to the polymer composite membrane of the disclosure the glass transition temperature of the vinylidene fluoride-hexafluoropropylene copolymer is $65°$ C. to $-40°$ C., for example, $-60°$ C. to $-40°$ C. According to an implementation of the disclosure, the vinylidene fluoride-hexafluoropropylene copolymer contains a polyvinylidene fluoride chain segment of 80 to 98 wt % and a polyhexafluoropropylene chain segment of 2 to 20 wt %, for example, contains a polyvinylidene fluoride chain segment of 90 to 96 wt % and a polyhexafluoropropylene chain segment of 4 to 10 wt %; and the glass transition temperature of the vinylidene fluoride-hexafluoropropylene copolymer is $-60°$ C. to $-40°$ C.

According to the polymer composite membrane of the disclosure in an implementation, the first bonding layer contains the acrylate crosslinked polymer and the styrene-acrylate crosslinked copolymer and does not contain the vinylidene fluoride-hexafluoropropylene copolymer, and a weight ratio of the acrylate crosslinked polymer to the styrene-acrylate crosslinked copolymer is 1:(0.05 to 2), for example, 1:(1 to 2); or the first bonding layer contains the acrylate crosslinked polymer and the vinylidene fluoride-hexafluoropropylene copolymer and does not contain the styrene-acrylate crosslinked copolymer, and a weight ratio of the acrylate crosslinked polymer to the vinylidene fluoride-hexafluoropropylene copolymer is 1:(0.3 to 25), for example, 1:(0.4 to 19); or the first bonding layer contains the acrylate crosslinked polymer, the styrene-acrylate crosslinked copolymer, and the vinylidene fluoride-hexafluoropropylene copolymer, and a weight ratio between the acrylate crosslinked polymer, the styrene-acrylate crosslinked copolymer and the vinylidene fluoride-hexafluoropropylene copolymer is 1:(0.01 to 2):(0.3 to 5), for example, 1:(0.05 to 1.5):(0.45 to 3). The inventor of the disclosure finds through in-depth research that, when the foregoing several polymers are cooperatively used according to the foregoing particular proportion, it is quite favorable to improvement in the liquid absorption rate and the conductivity of the polymer composite membrane and improvement in the manufacturing performance.

According to the polymer composite membrane of the disclosure in an implementation, the first bonding layer contains a first acrylate crosslinked polymer, a second acrylate crosslinked polymer, and the styrene-acrylate crosslinked copolymer and does not contain the vinylidene fluoride-hexafluoropropylene copolymer, and a weight ratio between the first acrylate crosslinked polymer, the second acrylate crosslinked polymer and the styrene-acrylate crosslinked copolymer is (5 to 10):1:(10 to 13).

Alternatively, the first bonding layer contains the first acrylate crosslinked polymer, the second acrylate crosslinked polymer, and the vinylidene fluoride-hexafluoropropylene copolymer and does not contain the styrene-acrylate crosslinked copolymer, and a weight ratio between the first acrylate crosslinked polymer, the second acrylate crosslinked polymer and the vinylidene fluoride-hexafluoropropylene copolymer is (5 to 15):1:(5 to 12).

Alternatively, the first bonding layer contains the second acrylate crosslinked polymer and the vinylidene fluoride-hexafluoropropylene copolymer and does not contain the styrene-acrylate crosslinked copolymer, and a weight ratio of the second acrylate crosslinked polymer to the vinylidene fluoride-hexafluoropropylene copolymer is 1:(5 to 20).

Alternatively, the first bonding layer contains the second acrylate crosslinked polymer, the styrene-acrylate crosslinked copolymer, and the vinylidene fluoride-hexafluoropropylene copolymer, and a weight ratio between the second acrylate crosslinked polymer, the styrene-acrylate crosslinked copolymer and the vinylidene fluoride-hexafluoropropylene copolymer is 1:(0.5 to 2):(1 to 5).

Alternatively, the first bonding layer contains the third acrylate crosslinked polymer, the styrene-acrylate crosslinked copolymer, and the vinylidene fluoride-hexafluoropropylene copolymer, and a weight ratio between the third acrylate crosslinked polymer, the styrene-acrylate crosslinked copolymer and the vinylidene fluoride-hexafluoropropylene copolymer is 1:(0.5 to 2):(1 to 5).

Alternatively, the first bonding layer contains the first acrylate crosslinked polymer, the second acrylate crosslinked polymer, the styrene-acrylate crosslinked copolymer, and the vinylidene fluoride-hexafluoropropylene copolymer, and a weight ratio between the first acrylate crosslinked polymer, the second acrylate crosslinked polymer, the styrene-acrylate crosslinked copolymer and the vinylidene fluoride-hexafluoropropylene copolymer is (10 to 15):1:(0.5 to 2):(5 to 10).

The first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer contains a polyvinylidene fluoride chain segment of 80 to 98 wt % and a polyhexafluoropropylene chain segment of 2 to 20 wt %; and the glass transition temperature of the first acrylate crosslinked polymer is 50° C. to 60° C., the glass transition temperature of the second acrylate crosslinked polymer is −20° C. to −5° C., the glass transition temperature of the third acrylate crosslinked polymer is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

According to the polymer composite membrane of the disclosure in an implementation, the first bonding layer further contains at least one of an acrylonitrile-acrylate copolymer, a vinyl chloride-propylene copolymer, and a butadiene-styrene copolymer. When the first bonding layer further contains an acrylonitrile-acrylate copolymer, it is favorable to improvement in the ion conductivity of the polymer composite membrane inside the battery; and when the first bonding layer further contains a vinyl chloride-propylene copolymer and/or a butadiene-styrene copolymer, it is favorable to reduction in the liquid absorption rate of the polymer composite membrane, so that the liquid absorption rate cannot go so far as to be excessively high. If the liquid absorption rate is excessively high, the positive electrode and the negative electrode inside the battery are lack of an electrolyte and consequently the performance of the battery is deteriorated.

When the first bonding layer further contains the acrylonitrile-acrylate copolymer, a weight ratio of the acrylonitrile-acrylate copolymer to the acrylate crosslinked polymer is (0.05 to 2):1, for example, (0.08 to 1.85):1. When the first bonding layer further contains the vinyl chloride-propylene copolymer, a weight ratio of the vinyl chloride-propylene copolymer to the acrylate crosslinked polymer is (0.15 to 7):1, for example, (0.2 to 6):1. When the first bonding layer further contains the butadiene-styrene copolymer, a weight ratio of the butadiene-styrene copolymer to the acrylate crosslinked polymer is (0.05 to 2):1, for example, (0.08 to 1.85):1.

Moreover, the single-sided surface density of the first bonding layer is optionally 0.05 mg/cm$^2$ to 0.9 mg/cm$^2$, for example, 0.1 mg/cm$^2$ to 0.6 mg/cm$^2$. The single-sided thickness of the first bonding layer is 0.1 μm to 2 μm, or the single-sided thickness of the first bonding layer is 0.1 μm to 1 μm, for example, 0.2 μm to 0.6 μm.

According to the polymer composite membrane of the disclosure in an implementation, the polymer composite membrane is formed by the polymer base membrane, the first ceramic layer, the first heat-resistant fiber layer, and the first bonding layer stacked sequentially. This polymer composite membrane having a four-layered structure in the disclosure has a relatively simple structure, to reduce the process difficulty, and by properly matching layer structures, it is favorable to optimize the comprehensive performance of the polymer composite membrane while reducing the occupied space of the polymer composite membrane and improving the entire space utilization of the battery.

According to the polymer composite membrane, in an implementation, the polymer composite membrane further includes at least one of an optional second ceramic layer, an optional second heat-resistant fiber layer, and an optional second bonding layer disposed sequentially from inside out on the second surface of the polymer base membrane. The thickness of the optional second ceramic layer is 0.5 µm to 5 µm (optionally 1 µm to 5 µm, for example, 2 µm to 3.5 µm), the thickness of the optional the second heat-resistant fiber layer is 0.5 µm to 10 µm (optionally 1 µm to 5 µm), and the thickness of the optional the second bonding layer is 0.1 µm to 2 µm (optionally 0.1 µm to 1 µm, for example, 0.2 µm to 0.6 µm). Components and contents of the components of the second ceramic layer may be the same as those of the first ceramic layer, components and contents of the components of the second heat-resistant fiber layer may be the same as those of the first heat-resistant fiber layer, components and contents of the components of the second bonding layer may be the same as those of the first bonding layer, and details are not described herein.

According to the polymer composite membrane, in an implementation, the following structure layers are disposed sequentially on the second surface of the porous base membrane: the second ceramic layer and the second heat-resistant fiber layer disposed sequentially from inside out; or the second ceramic layer and the second bonding layer disposed sequentially from inside out; or the second heat-resistant fiber layer and the second bonding layer disposed sequentially from inside out; or the second ceramic layer, the second heat-resistant fiber layer, and the second bonding layer disposed sequentially from inside out.

According to the polymer composite membrane of the disclosure, in an implementation, the polymer composite membrane further includes a second ceramic layer and a second bonding layer disposed sequentially from inside out on the second surface of the polymer base membrane, the second ceramic layer is the same as or different from the first ceramic layer, and the second bonding layer is the same as or different from the first bonding layer; and in an implementation, the polymer composite membrane is formed by the second bonding layer, the second ceramic layer, the polymer base membrane, the first ceramic layer, the first heat-resistant fiber layer, and the first bonding layer stacked sequentially.

According to the polymer composite membrane of the disclosure, in an implementation, the polymer composite membrane further includes a second ceramic layer, a second heat-resistant fiber layer, and a second bonding layer disposed sequentially from inside out on the second surface of the polymer base membrane, the second ceramic layer is the same as or different from the first ceramic layer, the second heat-resistant fiber layer is the same as or different from the first heat-resistant fiber layer, and the second bonding layer is the same as or different from the first bonding layer; and according to the polymer composite membrane of the disclosure, in an implementation, the polymer composite membrane is formed by the second bonding layer, the second heat-resistant fiber layer, the second ceramic layer, the polymer base membrane, the first ceramic layer, the first heat-resistant fiber layer, and the first bonding layer stacked sequentially.

Moreover, the disclosure further provides a method for preparing a polymer composite membrane, where the preparation method includes the following steps: S1: providing a polymer base membrane, where the polymer base membrane includes a first surface and a second surface disposed opposite to each other; S2: forming a first ceramic layer on the first surface of the polymer base membrane; S3: preparing a spinning solution containing a first polymeric material and a second polymeric material, and forming a first heat-resistant fiber layer on a surface of the first ceramic layer through electrostatic spinning by using the spinning solution; and S4: forming a first bonding layer on a surface of the first heat-resistant fiber layer, where the first polymeric material is a heat-resistant polymeric material whose melting point is above 180° C.; and the melting point of the second polymeric material is lower than that of the first polymeric material, and a liquid absorption rate of the second polymeric material in an electrolyte at 25° C. is above 40% and has an error of ±5%.

In some embodiments of the present disclosure, a liquid absorption rate of the first polymeric material in an electrolyte at 25° C. is below 5% and has an error of ±5%.

In some embodiments of the present disclosure, the glass transition temperature of the first polymeric material is above 100° C.

In some embodiments of the present disclosure, the melting point of the second polymeric material is 100° C. to 150° C.; and optionally, the glass transition temperature of the second polymeric material is below 25° C.

In some embodiments of the present disclosure, a liquid absorption rate of the second polymeric material in an electrolyte at 25° C. is 40% to 100% and has an error of ±5%.

In some embodiments of the present disclosure, in the spinning polymer, a weight ratio of the first polymeric material to the second polymeric material is (0.5 to 10):1, and is optionally (1 to 5):1, for example, (1 to 3):1.

According to the preparation method of the disclosure, in step S3, the first heat-resistant fiber layer may be further formed by using the following method: preparing a spinning solution containing a first polymeric material and a second polymeric material, forming a heat-resistant fiber layer through electrostatic spinning on a substrate by using the spinning solution, and then compounding the formed heat-resistant fiber layer onto at least one side surface of the porous base membrane to form the first heat-resistant fiber layer.

According to the preparation method of the disclosure, the following steps may be taken in step S3: S301: respectively independently preparing a spinning solution A containing the first polymeric material and a spinning solution B containing the second polymeric material; and S302: performing electrostatic spinning by using the spinning solution A and the spinning solution B to form the first heat-resistant fiber layer. In this case, the formed first heat-resistant fiber layer (spinning layer) contains both the first polymeric material and the second polymeric material.

According to the method for preparing a polymer composite membrane, the following steps may alternatively be taken in step S2: S311: mixtureing the first high-molecule material and the second high-molecule material (an optional mixtureing condition includes: mixtureing for 2 h to 6 h under a condition of a normal temperature and a rotational speed of 300 to 2000 rpm), to form a mixture; and then preparing a spinning solution containing the mixture; and S312: performing electrostatic spinning by using the spinning solution to form the first heat-resistant fiber layer. In this case, the fiber materials of the formed first heat-resistant fiber layer (spinning layer) are a mixture of the first polymeric material and the second polymeric material.

According to the preparation method of the disclosure, in an implementation, the first polymeric material and the second polymeric material are mixtureed in a weight ratio of (0.5 to 10):1, for example, (1 to 5):1 or (1 to 3):1. The method in which the spinning solution is prepared to perform spinning after the first polymeric material and the second polymeric material are mixtureed to form a mixture has the effect of forming a fiber-shaped network structure, to be favorable to improvement in the thermal stability of the polymer composite membrane.

According to the preparation method of the disclosure, the first polymeric material and the second polymeric material in the foregoing spinning solution are dissolved by using a solvent, so as to smoothly implement a subsequent electrostatic spinning process. In the disclosure, the solvent is selected from one or more of acetone, N,N-dimethylacetamide, N,N-dimethylacetamide, N-methypyrrolidone, toluene, and the like.

According to the preparation method of the disclosure, the foregoing spinning solution (including the spinning solution A, the spinning solution B, and the spinning solution containing the mixture of the first polymeric material and the second polymeric material) is used to prepare the first heat-resistant fiber layer through an electrostatic spinning method in a subsequent step. Therefore, in the spinning solution, the concentration range of the spinning polymer (including the first polymeric material and/or the second polymeric material) is the concentration range in which spinning may be performed by using the electrostatic spinning method. In an implementation, in the disclosure, in step S3, in the spinning solution, the concentration of the spinning polymer is 3 wt % to 30 wt %, for example, 8 wt % to 20 wt %. When the relative molecular mass of the spinning polymer is fixed, if other conditions are determined, the concentration of the spinning solution is a decisive factor of affecting intertwining of a molecular chain in the solution. Polymer solutions may be divided into a polymer dilute solution, a semi-dilute solution, and a concentrated solution according to different concentrations and molecular chain morphologies. In the dilute solution, molecular chains are separated from each other and distributed evenly, and as the concentration of the solution is increased, molecular chains are intermixed and overlapped with each other, and are intertwined. A dividing concentration between the dilute solution and the semi-dilute solution is referred to as a contact concentration, and is a concentration in which molecular chains are in contact with each other and are subsequently overlapped as the concentration of the solution is increased. A dividing concentration between the semi-dilute solution and the concentrated solution is referred to as an intertwining concentration, and is a concentration in which molecular chains are intermixed with each other and intertwined with each other as the concentration of the solution is further increased. In the disclosure, when the concentration of the spinning solution falls within the foregoing range, the filamentation performance may be effectively ensured. Moreover, as the concentration of the spinning solution is increased, the polymer intertwining degree is increased, and the filamentation performance is better. In the disclosure, when spinning solutions containing different polymers are used to perform electrostatic spinning, the concentration of each spinning solution is independently selected from the foregoing concentration range.

According to the preparation method of the disclosure, the method for preparing the first heat-resistant fiber layer in step S3 is electrostatic spinning, and the basic principle of the electrostatic spinning is well known by a person skilled in the art, and is specifically: applying a voltage between an ejection device and an acceptance device, forming a jet stream from a spinning solution originating from a pyramidal end portion of the ejection device, stretching the jet stream in an electric field, and finally forming fiber on the acceptance device. The acceptance device includes a roller (rotatable) or a receiving plate. The electrostatic spinning method usually includes a needle spinning method and a needleless spinning method, and each specific process is well known by a person skilled in the art. Details are not described herein.

When the electrostatic spinning method is the needle spinning method, the stream velocity of the spinning solution is optionally 0.3 mL/h to 5 mL/h, for example, 0.6 mL/h to 2 mL/h; the spinning temperature is optionally 25° C. to 70° C., for example, 30° C. to 50° C.; the spinning humidity is optionally 2% to 60%, for example, 2% to 50%; and the spinning voltage is optionally 5 kV to 25 kV, for example, 8 kV to 20 kV. When the stream velocity falls within the foregoing optional range, it may be ensured that an appropriate fiber diameter is obtained, and the needle may be effectively prevented from being jammed, to ensure smooth spinning. Particularly, on the premise that the mixed solvent provided in the disclosure is used, if the stream velocity is controlled to fall within the foregoing range, a first heat-resistant fiber layer having excellent porosity and bonding performance may be obtained. When the spinning temperature and the spinning humidity fall within the foregoing range, in cooperation with the foregoing mixed solvent, it is ensured that fiber obtained through spinning is smoothly filamented and then dried, to prevent the fiber from being subject to adhesion which causes decrease in the porosity, and the bonding performance of the first heat-resistant fiber layer may be prevented from being decreased. When the voltage falls within the foregoing range, the spinning solution may be effectively motivated to form a jet stream, thereby generating an effective stretching effect in the electric field, obtaining fiber whose diameter is appropriate, ensuring the morphology of the formed fiber, and facilitating improvement in the porosity and the bonding performance of the first heat-resistant fiber layer. Moreover, the receiving device is optionally a roller, and the rotational speed of the roller is optionally 100 rpm to 6000 rpm, for example, 1000 rpm to 2000 rpm. When the linear velocity of a surface of a collection device used to collect fiber is excessively small, because a jet stream in rapid movement is in a disordered state, fiber formed in this case is distributed on the surface of the collection device in an irregular accumulation state, and the mechanical strength of the obtained first heat-resistant fiber layer is relatively poor. When the linear velocity of the surface of the collection device reaches a particular level, the formed fiber is tightly attached onto the surface of the collection device in a circular manner, and the fiber is deposited in a same direction, and is basically in a straight state, that is, fiber bundles that are straight and extend in a same direction are generated. On the other hand, when the linear velocity of the surface of the collection device is excessively large, because an excessively rapid receiving speed damages the jet stream of the fiber, continuous fiber cannot be obtained. Through continuous experiments on a regular electrostatic spinning process, the inventor finds that, only when the rotational speed of the collection device is 100 rpm to 6000 rpm, fiber bundles that are straight and extend in a same direction may be obtained. In an implementation, when the rotational speed of the collection device is 1000 rpm to 2000 rpm, in the obtained first heat-resistant fiber layer, the morphology of the fiber is better, to be more favorable to improvement in the mechanical strength of the first heat-resistant fiber layer.

When the electrostatic spinning method is the needleless spinning method, spinning conditions optionally include: the temperature is 25° C. to 70° C., the humidity is 2% to 60%, the movement speed of a liquid pool is 0 mm/sec to 2000 mm/sec, the movement speed of a base material is 0 mm/min to 20000 mm/min (in this case, the collection device is plate-shaped, and does not rotate) or the rotational speed of a roller is 100 rpm to 6000 rpm (in this case, the collection device is the roller), the voltage of a positive electrode (the voltage of a source end for generating fiber) is 0 kV to 150 kV, the voltage of a negative electrode (the voltage of the collection device) is −50 kV to 0 kV, and a voltage difference (a difference between the voltage of the source end and that of the collection device) is 10 kV to 100 kV; and optionally include: the temperature is 30° C. to 50° C., the humidity is 2% to 50%, the movement speed of a liquid pool is 100 mm/sec to 400 mm/sec, the movement speed of a base material is 1000 mm/min to 15000 mm/min or the rotational speed of a roller is 1000 rpm to 2000 rpm, the voltage of a positive electrode is 10 kV to 40 kV, the voltage of a negative electrode is −30 kV to 0 kV, and a voltage difference is 20 kV to 60 kV.

Further, according to the present disclosure, on the premise that the concentration of the spinning polymer in the spinning solution falls within the foregoing optional range, by using the electrostatic spinning process under the foregoing conditions, the volatilization speed of the solvent may well match the fiber forming speed, a first heat-resistant fiber layer whose appearance is good and adhesivity is higher and in which the adhesivity between filaments in the first heat-resistant fiber layer is better may be obtained, and the porosity of the first heat-resistant fiber layer may be above 80%, or the porosity of the first heat-resistant fiber layer may be 80% to 90%, or the porosity of the first heat-resistant fiber layer may be 80% to 85%.

In the disclosure, the diameter of the fiber in and the thickness of the first heat-resistant fiber layer are not particularly limited, and may be specifically altered by controlling a specific process condition. The average diameter of the fiber is 100 nm to 2000 nm, and the single-sided thickness of the first heat-resistant fiber layer is 0.5 μm to 30 μm; the surface density of the first heat-resistant fiber layer is 0.2 g/m$^2$ to 15 g/m$^2$, for example, 3 g/m$^2$ to 6 g/m$^2$; and the porosity of the first heat-resistant fiber layer is 75% to 95%.

According to the preparation method of the disclosure, after step S3 in which the first heat-resistant fiber layer is formed on a surface of the first ceramic layer through electrostatic spinning, the method further includes: selectively performing membrane lamination processing at 50° C. to 120° C. and under 0.5 Mpa to 15 Mpa, for example, performing thermal rolling (thermal rolling conditions are: the temperature is 50° C. to 60° C., and the pressure is 1 MPa to 15 MPa), and then performing air blowing and drying for 24 h at 50° C.

According to the preparation method of the disclosure, for a method for preparing the first ceramic layer in step S2, refer to a regular method in the field. In an implementation, a method for preparing the ceramic layer in step S2 includes: S12: mixing and stirring ceramic particles, a binder, a dispersant, and a thickener according to a weight ratio of 100:(2 to 8):(0.3 to 1):(0.5 to 1.8) to obtain a first ceramic layer slurry, applying the first ceramic layer slurry onto at least one side surface of the polymer base membrane, and performing drying to obtain the first ceramic layer (optionally, the first ceramic layer is formed on each of two side surfaces of the polymer base membrane), where the number-average molecular weight of the dispersant is below 50000.

According to the preparation method of the disclosure, the dispersity of raw materials in the first ceramic layer slurry and the stability of the first ceramic layer slurry are comprehensively considered, and optionally in step S2, the ceramic particles, the binder, the dispersant, and the thickener are at 3000 rpm to 10000 rpm, for example, 3000 rpm to 9000 rpm, and particularly optionally at 3000 rpm to 8000 rpm. When substances for forming the first ceramic layer slurry are mixed at the foregoing optional rotational speed, it is more favorable to improvement in the surface density of the first ceramic layer.

According to the preparation method of the disclosure, optionally, the ceramic particles, the binder, the dispersant, and the thickener are mixed according to the foregoing weight ratio, and when the use amount of the dispersant is less than 0.3 part by weight and/or the use amount of the thickener is less than 0.5 part by weight, the dispersity of the ceramic slurry may be insufficient, and it is difficult to form highly dense accumulation so as to obtain the surface density of 1.8 mg/cm$^2$<ρ≤2.7 mg/cm$^2$ of the disclosure; and when the use amount of the dispersant is greater than 1 part by weight and/or the use amount of the thickener is greater than 1.8 parts by weight, the air permeability of the membrane may be affected and consequently the output characteristic of the battery is affected. When the use amount of the binder is less than 2 parts by weight, the bonding strength may be insufficient; and when the use amount of the binder is greater than 8 parts by weight, the air permeability of the ceramic layer may be affected. When the number-average molecular weight of the dispersant is higher than 50000, the dispersion effect of the ceramic slurry may be affected, and the surface density may be reduced. When the foregoing stirring rotational speed is less than 3000 rpm, the slurry is dispersed insufficiently, and highly dense accumulation may be formed to obtain the surface density of 1.8 mg/cm$^2$<ρ≤2.7 mg/cm$^2$; and when the foregoing stirring rotational speed is greater than 10000 rpm, the stability of the first ceramic layer slurry may be damaged.

According to the preparation method of the disclosure, the thickness of the polymer base membrane may be usually 5 μm to 30 μm, in some embodiments of the present disclosure, the thickness of the polymer base membrane may be 6 μm to 25 μm. The material of the polymer base membrane is described above, and details are not described herein. Moreover, the use amount of the first ceramic layer slurry may be selected to enable the single-sided thickness of the obtained first ceramic layer to be 1 μm to 5 μm, for example, 2 μm to 3.5 μm, so as to be more favorable to improvement in the high-temperature resistance and thermal-shrinkage resistance performance of the ceramic membrane (which includes the polymer base membrane and the ceramic layer) and improvement in the air permeability. Types and properties of the ceramic particles, the binder, the dispersant, and the thickener in the first ceramic layer slurry and the material of the polymer base membrane are described above, and details are not described herein.

Optionally, in step S2, the ceramic particles, the binder, the dispersant, and the thickener are stirred and mixed according to a weight ratio of 100:(4 to 6):(0.4 to 0.8):(0.7 to 1.5). When the use amount of each substance in the first ceramic layer slurry is controlled to be within the foregoing optional range, the obtained ceramic membrane (which includes the polymer base membrane and the ceramic layer) is enabled to have higher surface density and better high-temperature resistance and thermal-shrinkage resistance performance.

Moreover, according to the method for preparing a polymer composite membrane of the disclosure, in an implementation, the first ceramic layer slurry obtained through mixing in step S2 may further contain a surface treating agent, and the surface treating agent is 3-glycidyloxypropyltrimethoxysilane and/or 3-glycidyloxypropyltriethoxysilane. In this way, interaction between the ceramic particles and the binder can be further improved, to enhance the strength of the ceramic membrane (which includes the polymer base membrane and the ceramic layer). Moreover, relative to the ceramic particles of 100 parts by weight, a use amount of the surface treating agent is optionally below 1.5 parts by weight, for example, 0.5 to 1.2 parts by weight. In this way, it is more favorable to improvement in the air permeability of the ceramic membrane (which includes the polymer base membrane and the ceramic layer).

Moreover, the first ceramic layer slurry may further contain surfactants such as sodium dodecylbenzenesulfonate, and use amounts of these surfactants may be regularly selected in the field. This can be known by each person skilled in the art, and details are not described herein.

According to the preparation method of the disclosure, in an implementation, step S2 includes: stirring the ceramic particles, the dispersant, and the thickener at a rotational speed of 3000 rpm to 10000 rpm for 0.5 to 3 hours, then adding the surface treating agent and continuing to stir for 0.5 to 3 hours, then adding the binder and stirring for 0.5 to 2 hours at a rotational speed of 3000 rpm to 4000 rpm, then applying the obtained slurry onto at least one side surface of the polymer base membrane, and then performing drying to form the first ceramic layer on the at least one side surface of the polymer base membrane, where the ceramic particles, the binder, the dispersant, and the thickener are fed according to a weight ratio of 100:(2 to 8):(0.3 to 1):(0.5 to 1.8), and the number-average molecular weight of the dispersant is below 50000. The temperature of the drying is 50° C. to 80° C.

According to the preparation method of the disclosure, for a step of forming the first bonding layer in step S4, refer to a regular method in the field. In an implementation, a method for forming the first bonding layer includes: attaching a first bonding layer slurry containing a self-crosslinking pure acrylic emulsion and a self-crosslinking styrene acrylic emulsion and/or a copolymer emulsion of vinylidene fluoride and hexafluoropropylene onto a surface of the first heat-resistant fiber layer, and then performing drying, to form the first bonding layer whose porosity is 40% to 65%. In this case, the ceramic membrane (which includes the polymer base membrane and the ceramic layer) not only has good high-temperature resistance and thermal-shrinkage resistance performance, but also has higher ion conductivity and bonding strength, to have a better industrial application prospect.

The self-crosslinking pure acrylic emulsion is an emulsion obtained by performing emulsion polymerization on reaction-type acrylate monomers. The crosslinking degree of the acrylate crosslinked polymer in the self-crosslinking pure acrylic emulsion may be 2% to 30%, and is optionally 5% to 20%. Moreover, the glass transition temperature of the acrylate crosslinked polymer in the self-crosslinking pure acrylic emulsion is optionally −20° C. to 60° C., for example, −12° C. to 54° C. According to an implementation of the disclosure, the self-crosslinking pure acrylic emulsion is a first self-crosslinking pure acrylic emulsion and a second self-crosslinking pure acrylic emulsion and/or a third self-crosslinking pure acrylic emulsion mixture, or is a second self-crosslinking pure acrylic emulsion, or is a third self-crosslinking pure acrylic emulsion; an acrylate crosslinked polymer in the first self-crosslinking pure acrylic emulsion contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, an acrylate crosslinked polymer in the second self-crosslinking pure acrylic emulsion contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and an acrylate crosslinked polymer in the third self-crosslinking pure acrylic emulsion contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; and the glass transition temperature of the acrylate crosslinked polymer in the first self-crosslinking pure acrylic emulsion is 50° C. to 60° C., the glass transition temperature of the acrylate crosslinked polymer in the second self-crosslinking pure acrylic emulsion is −20° C. to −5° C., and the glass transition temperature of the acrylate crosslinked polymer in the third self-crosslinking pure acrylic emulsion is 30° C. to 50° C.

The self-crosslinking styrene acrylic emulsion is a copolymer emulsion obtained by copolymerizing a styrene monomer and a reaction-type acrylate monomer. A weight ratio of a styrene structure unit to an acrylate structure unit in the styrene-acrylate crosslinked copolymer may be (0.5 to 2):1, and is optionally (0.67 to 1.5):1. The crosslinking degree of the styrene-acrylate crosslinked copolymer in the self-crosslinking styrene acrylic emulsion may be 2% to 30%, and is optionally 5% to 20%. Moreover, the glass transition temperature of the styrene-acrylate crosslinked copolymer in the self-crosslinking styrene acrylic emulsion is optionally −30° C. to 50° C., for example, −20° C. to 50° C. In an implementation, the styrene-acrylate crosslinked copolymer in the self-crosslinking styrene acrylic emulsion contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; and the glass transition temperature of the styrene-acrylate crosslinked copolymer is 15° C. to 30° C.

The glass transition temperature of the vinylidene fluoride-hexafluoropropylene copolymer in the copolymer emulsion of vinylidene fluoride and hexafluoropropylene is optionally −65° C. to −40° C., for example, −60° C. to −40° C. According to an implementation of the disclosure, the vinylidene fluoride-hexafluoropropylene copolymer in the copolymer emulsion of vinylidene fluoride and hexafluoropropylene contains a polyvinylidene fluoride chain segment of 80 to 98 wt % and a polyhexafluoropropylene chain segment of 2 to 20 wt %, for example, contains a polyvinylidene fluoride chain segment of 90 to 96 wt % and a polyhexafluoropropylene chain segment of 4 to 10 wt %; and the glass transition temperature of the vinylidene fluoride-hexafluoropropylene copolymer is optionally −60° C. to −40° C.

The copolymer emulsion of vinylidene fluoride and hexafluoropropylene may be commercially available, or may be prepared by using various existing methods, or may be obtained by making vinylidene fluoride-hexafluoropropylene copolymer powder into an emulsion. According to a specific implementation of the disclosure, the copolymer emulsion of vinylidene fluoride and hexafluoropropylene is prepared by using the following method:

(1) dissolving a dispersant in water, and selectively adjusting a pH value thereof, to obtain an aqueous solution A of the dispersant; and (2) slowly adding vinylidene fluoride-hexafluoropropylene copolymer powder into the aqueous solution A of the dispersant while stirring; and after the vinylidene fluoride-hexafluoropropylene copolymer powder is added completely, first stirring at a low speed, then stirring at a high speed, and finally performing homogeneous dispersion at a high pressure, to form the copolymer emulsion of vinylidene fluoride and hexafluoropropylene.

The dispersant is a water-soluble polymer dispersant, including two types: an ionic dispersant (polyelectrolyte) and a non-ionic dispersant. The ionic dispersant is a polycarboxylic acid dispersant that is obtained by homopolymerizing vinyl monomers containing carboxyl (for example, acrylic acid or maleic anhydride) or copolymerizing a vinyl monomer containing carboxyl and another monomer, and then performing alkali neutralization and alcohol esterification. Examples of the ionic dispersant include but are not limited to: polyacrylic acid (PAA), polyethylenimine (PEI), cetyltrimethylammonium bromide (CTAB), polyamide, polyacrylamide (PAM), an acrylic acid-acrylate copolymer, poly(acrylic acid-co-acrylamide) [P(AA/AM)], an ammonium acrylate-acrylate copolymer, poly(styrene-co-maleic anhydride) (SMA), a styrene-acrylic acid copolymer, an acrylic acid-maleic anhydride copolymer, a maleic anhydride-acrylamide copolymer, and the like. The non-ionic dispersant includes polyethylene glycol (PEG), polyvinyl alcohol (PVA), polyvinylpyrrolidone (PVP), fatty alcohol polyoxyethylene ether (JFC), and the like. The weight-average molecular weight of the dispersant is 100 g/mol to 500000 g/mol, and is optionally 1000 g/mol to 100000 g/mol. The concentration of the aqueous solution A of the dispersant is 0.01 wt % to 10 wt %, is optionally 0.05 wt % to 5 wt %, for example, 0.1 wt % to 2 wt %. The use amount of the dispersant is 0.05 wt % to 10 wt % of the use amount of the used vinylidene fluoride-hexafluoropropylene copolymer powder, optionally 0.1 wt % to 6 wt %, for example, 0.1 wt % to 2 wt %. When the used ionic dispersant is an anionic polymer (for example, PAM), the solution is adjusted to pH=8 to 9, and the anionic polymer may be completely dissociated, thereby effectively protecting the vinylidene fluoride-hexafluoropropylene copolymer powder, and stably dispersing the vinylidene fluoride-hexafluoropropylene copolymer powder in an aqueous phase. When the used ionic dispersant is a cationic polymer (for example, PEI or CTAB), the solution is adjusted to pH=4 to 5, and the cationic polymer may be dissociated quite well, thereby effectively protecting the vinylidene fluoride-hexafluoropropylene copolymer powder, and stably dispersing the vinylidene fluoride-hexafluoropropylene copolymer powder in an aqueous phase. When the used dispersant is a non-ionic polymer dispersant, the pH value of the solution is not adjusted.

According to an implementation of the disclosure, the first bonding layer slurry contains the self-crosslinking pure acrylic emulsion and the self-crosslinking styrene acrylic emulsion and does not contain the copolymer emulsion of vinylidene fluoride and hexafluoropropylene, and a weight ratio of a solid content of the self-crosslinking pure acrylic emulsion to that of the self-crosslinking styrene acrylic emulsion is 1:(0.05 to 2), for example, 1:(1 to 2); or the first bonding layer slurry contains the self-crosslinking pure acrylic emulsion and the copolymer emulsion of vinylidene fluoride and hexafluoropropylene and does not contain the self-crosslinking styrene acrylic emulsion, and a weight ratio of a solid content of the self-crosslinking pure acrylic emulsion to that of the copolymer emulsion of vinylidene fluoride and hexafluoropropylene is 1:(0.3 to 25), for example, 1:(0.4 to 19); or the first bonding layer slurry contains the self-crosslinking pure acrylic emulsion, the self-crosslinking styrene acrylic emulsion, and the copolymer emulsion of vinylidene fluoride and hexafluoropropylene, and a weight ratio between a solid content of the self-crosslinking pure acrylic emulsion, a solid content of the self-crosslinking styrene acrylic emulsion and a solid content of the copolymer emulsion of vinylidene fluoride and hexafluoropropylene is 1:(0.01 to 2):(0.3 to 5), for example, 1:(0.05 to 1.5):(0.45 to 3). The inventor of the disclosure finds through in-depth research that, when the foregoing several polymer emulsions are cooperatively used according to the foregoing particular proportion, it is quite favorable to improvement in the liquid absorption rate and the conductivity of the ceramic membrane (which includes the polymer base membrane and the ceramic layer) and improvement in the manufacturing performance.

According to a particular optional implementation of the disclosure, the first bonding layer slurry contains a first self-crosslinking pure acrylic emulsion, a second self-crosslinking pure acrylic emulsion, and the self-crosslinking styrene acrylic emulsion and does not contain the copolymer emulsion of vinylidene fluoride and hexafluoropropylene, and a weight ratio of a solid content of the first self-crosslinking pure acrylic emulsion to that of the second self-crosslinking pure acrylic emulsion to that of the self-crosslinking styrene acrylic emulsion is (5 to 10):1:(10 to 13).

Alternatively, the first bonding layer slurry contains the first self-crosslinking pure acrylic emulsion, the second self-crosslinking pure acrylic emulsion, and the copolymer emulsion of vinylidene fluoride and hexafluoropropylene and does not contain the self-crosslinking styrene acrylic emulsion, and a weight ratio of a solid content of the first self-crosslinking pure acrylic emulsion to that of the second self-crosslinking pure acrylic emulsion to that of the copolymer emulsion of vinylidene fluoride and hexafluoropropylene is (5 to 15):1:(5 to 12).

Alternatively, the first bonding layer slurry contains the second self-crosslinking pure acrylic emulsion and the copolymer emulsion of vinylidene fluoride and hexafluoropropylene and does not contain the self-crosslinking styrene acrylic emulsion, and a weight ratio of a solid content of the second self-crosslinking pure acrylic emulsion to that of the copolymer emulsion of vinylidene fluoride and hexafluoropropylene is 1:(5 to 20).

Alternatively, the first bonding layer slurry contains the second self-crosslinking pure acrylic emulsion, the self-crosslinking styrene acrylic emulsion, and the copolymer emulsion of vinylidene fluoride and hexafluoropropylene, and a weight ratio between a solid content of the second self-crosslinking pure acrylic emulsion, a solid content of the self-crosslinking styrene acrylic emulsion and a solid content of the copolymer emulsion of vinylidene fluoride and hexafluoropropylene is 1:(0.5 to 2):(1 to 5).

Alternatively, the first bonding layer slurry contains the third self-crosslinking pure acrylic emulsion, the self-crosslinking styrene acrylic emulsion, and the copolymer emulsion of vinylidene fluoride and hexafluoropropylene, and a weight ratio between a solid content of the third self-crosslinking pure acrylic emulsion, a solid content of the self-crosslinking styrene acrylic emulsion and a solid content of the copolymer emulsion of vinylidene fluoride and hexafluoropropylene is 1:(0.5 to 2):(1 to 5).

Alternatively, the first bonding layer slurry contains the first self-crosslinking pure acrylic emulsion, the second self-crosslinking pure acrylic emulsion, the self-crosslinking styrene acrylic emulsion, and the copolymer emulsion of vinylidene fluoride and hexafluoropropylene, and a weight ratio between a solid content of the first self-crosslinking pure acrylic emulsion, a solid content of the second self-crosslinking pure acrylic emulsion, a solid content of self-crosslinking styrene acrylic emulsion and a solid content of the copolymer emulsion of vinylidene fluoride and hexafluoropropylene is (10 to 15):1:(0.5 to 2):(5 to 10).

An acrylate crosslinked polymer in the first self-crosslinking pure acrylic emulsion contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, an acrylate crosslinked polymer in the second self-crosslinking pure acrylic emulsion contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and an acrylate crosslinked polymer in the third self-crosslinking pure acrylic emulsion contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer in the self-crosslinking styrene acrylic emulsion contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer in the copolymer emulsion of vinylidene fluoride and hexafluoropropylene contains a polyvinylidene fluoride chain segment of 80 to 98 wt % and a polyhexafluoropropylene chain segment of 2 to 20 wt %; and the glass transition temperature of the acrylate crosslinked polymer in the first self-crosslinking pure acrylic emulsion is 50° C. to 60° C., the glass transition temperature of the acrylate crosslinked polymer in the second self-crosslinking pure acrylic emulsion is −20° C. to −5° C., the glass transition temperature of the acrylate crosslinked polymer in the third self-crosslinking pure acrylic emulsion is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

According to the disclosure, optionally, the first bonding layer slurry further contains at least one of a copolymer emulsion of acrylonitrile and acrylate, a vinyl chloride-propylene emulsion, and a butadiene-styrene latex. When the first bonding layer slurry further contains a copolymer emulsion of acrylonitrile and acrylate, it is favorable to improvement in the ion conductivity of the ceramic membrane (which includes the polymer base membrane and the ceramic layer) inside the battery; and when the first bonding layer slurry further contains a vinyl chloride-propylene emulsion and/or a butadiene-styrene latex, it is favorable to reduction in the liquid absorption rate of the ceramic membrane (which includes the polymer base membrane and the ceramic layer), so that the liquid absorption rate cannot go so far as to be excessively high. If the liquid absorption rate is excessively high, the positive electrode and the negative electrode inside the battery are lack of an electrolyte and consequently the performance of the battery is deteriorated.

When the first bonding layer slurry further contains the copolymer emulsion of acrylonitrile and acrylate, a weight ratio of a solid content of the copolymer emulsion of acrylonitrile and acrylate to that of the self-crosslinking pure acrylic emulsion is (0.05 to 2):1, for example, (0.08 to 1.85):1. When the first bonding layer slurry further contains the vinyl chloride-propylene emulsion, a weight ratio of a solid content of the vinyl chloride-propylene emulsion to that of the self-crosslinking pure acrylic emulsion is (0.15 to 7):1, for example, (0.2 to 6):1. When the first bonding layer slurry further contains the butadiene-styrene latex, a weight ratio of a solid content of the butadiene-styrene latex to that of the self-crosslinking pure acrylic emulsion is (0.05 to 2):1, for example, (0.08 to 1.85):1.

Moreover, to be more favorable to attachment of the first bonding layer slurry, optionally, the total solid content of the first bonding layer slurry is 0.5 wt % to 25 wt %, is optionally 1 wt % to 20 wt %, and is optionally 1 wt % to 10 wt %.

A spraying method and/or a screen-printing method is optionally used as the attaching method, and discontinuous coverage is formed by using the spraying method and/or the screen-printing method, thereby directly forming a porous membrane having the foregoing porosity. In this way, a porous (discontinuous) self-crosslinking polymer coating can be prepared, and a separation process is not required.

In the disclosure, conditions of the spraying and the screen-printing are not particularly limited. For example, the temperature of the spraying is optionally 30° C. to 80° C., for example, 40° C. to 75° C. The temperature of the screen-printing is optionally 30° C. to 80° C., for example, 40° C. to 75° C.

The use amount of the first bonding layer slurry may be selected to enable the single-sided thickness of the formed first bonding layer to be 0.1 μm to 1 μm, for example, 0.2 μm to 0.6 μm.

In the disclosure, the temperature for drying the first bonding layer slurry is not particularly limited, is 30° C. to 80° C., for example, 40° C. to 75° C.

The preparation method according to the disclosure further includes: forming a second ceramic layer on the second surface of the polymer base membrane; and forming a second bonding layer on a surface of the second ceramic layer, so as to form a polymer composite membrane that has a six-layered structure and that is formed by the second bonding layer, the second ceramic layer, the polymer base membrane, the first ceramic layer, the first heat-resistant fiber layer, and the first bonding layer stacked sequentially.

The preparation method according to the disclosure further includes: forming a second ceramic layer on the second surface of the polymer base membrane; and forming a second heat-resistant fiber layer on a surface of the second ceramic layer; and forming a second bonding layer on a surface of the second heat-resistant fiber layer, so as to form a polymer composite membrane that has a seven-layered structure and that is formed by the second bonding layer, the second heat-resistant fiber layer, the second ceramic layer, the polymer base membrane, the first ceramic layer, the first heat-resistant fiber layer, and the first bonding layer stacked sequentially.

A same preparation process may be used for the second ceramic layer and the first ceramic layer, a same preparation process may be used for the second heat-resistant fiber layer and the first heat-resistant fiber layer, a same preparation process may be used for the second bonding layer and the first bonding layer, each corresponding preparation process is described above, and details are not described herein again.

The disclosure further provides a polymer composite membrane prepared by using the foregoing method.

Moreover, the disclosure further provides a lithium-ion battery, and the lithium-ion battery includes a positive electrode plate, a negative electrode plate, an electrolyte, and a polymer composite membrane, where the polymer composite membrane is the foregoing polymer composite membrane of the disclosure.

The electrolyte is well known by a person skilled in the art, and is usually formed by an electrolyte lithium salt and an organic solvent. A dissociable lithium salt is used as the electrolyte lithium salt. For example, the electrolyte lithium salt may be selected from at least one of lithium hexafluorophosphate ($LiPF_6$), lithium perchlorate ($LiClO_4$), lithium tetrafluoroborate ($LiBF_4$), and the like, and the organic solvent may be selected from at least one of ethylene carbonate (EC), propylene carbonate (PC), dimethyl carbonate (DMC), ethyl methyl carbonate (EMC), diethyl carbonate (DEC), vinylene carbonate (VC), and the like. Optionally, the concentration of the electrolyte lithium salt in the electrolyte is 0.8 mol/L to 1.5 mol/L.

The positive electrode plate is made by mixing a positive electrode material used for the lithium-ion battery, a conductive agent, and a binder into a slurry and applying the slurry onto an aluminum foil. The used positive electrode material includes any positive electrode material that may be used for the lithium-ion battery, for example, at least one of lithium cobalt oxide ($LiCoO_2$), lithium nickel oxide ($LiNiO_2$), lithium manganese oxide ($LiMn_2O_4$), lithium iron phosphate ($LiFePO_4$), and the like.

The negative electrode plate is made by mixing a negative electrode material used for the lithium-ion battery, a conductive agent, and a binder into a slurry and applying the slurry onto a copper foil. The used negative electrode material includes any negative electrode material that may be used for the lithium-ion battery, for example, at least one of graphite, soft carbon, hard carbon, and the like.

An improvement of the lithium-ion battery provided in the disclosure is in that a novel polymer composite membrane is used as the polymer composite membrane, and an arrangement manner (connection manner) of the positive electrode plate, the negative electrode plate, the polymer composite membrane, and the electrolyte may be the same as that in the prior art. This can be known by each person skilled in the art, and details are not described herein.

The lithium-ion battery provided in the disclosure has advantages of good cycle performance, long service life, good rate charge/discharge performance, and good high-temperature performance.

A method for preparing a lithium-ion battery provided in the disclosure includes: stacking or winding a positive electrode plate, a battery membrane, and a negative electrode plate sequentially into an electrode core, then injecting an electrolyte into the electrode core, and performing sealing, where the battery membrane is the foregoing polymer composite membrane. The materials or formations of the positive electrode plate, the negative electrode plate, and the electrolyte are described above, and details are not described herein.

The disclosure is described in detail below by using specific embodiments.

In the following embodiments and comparison examples, physicochemical parameters of raw materials are as follows:

(1) Components of a self-crosslinking pure acrylic emulsion:

1.1. 1040: a polybutyl acrylate chain segment accounts for 15 wt %, a polymethyl methacrylate chain segment accounts for 75 wt %, a polyethylene acrylate chain segment accounts for 5 wt %, a polyacrylic acid chain segment accounts for 5 wt %, the glass transition temperature Tg=54° C., and the solid content is 50 wt %, Shanghai Aigao Chemical Co., Ltd.;

1.2. 1005: a polybutyl acrylate chain segment accounts for 55 wt %, a polymethyl methacrylate chain segment accounts for 35 wt %, a polyethylene acrylate chain segment accounts for 5 wt %, a polyacrylic acid chain segment accounts for 5 wt %, the glass transition temperature Tg=−12° C., and the solid content is 50 wt %, Shanghai Aigao Chemical Co., Ltd.; and 1.3. 1020: a polybutyl acrylate chain segment accounts for 25 wt %, a polymethyl methacrylate chain segment accounts for 65 wt %, a polyethylene acrylate chain segment accounts for 5 wt %, a polyacrylic acid chain segment accounts for 5 wt %, the glass transition temperature Tg=40° C., and the solid content is 50 wt %, Shanghai Aigao Chemical Co., Ltd.

(2) Components of a self-crosslinking styrene acrylic emulsion:

S601: a polyphenyl ethylene chain segment accounts for 45 wt %, a polybutyl acrylate chain segment accounts for 35 wt %, a polymethyl methacrylate chain segment accounts for 10 wt %, a polyethylene acrylate chain segment accounts for 5 wt %, a polyacrylic acid chain segment accounts for 5 wt %, the glass transition temperature Tg=22° C., and the solid content is 50 wt %, Shanghai Aigao Chemical Co., Ltd.

(3) Copolymer emulsion of vinylidene fluoride and hexafluoropropylene:

10278: a polyvinylidene fluoride chain segment accounts for 95 wt %, a polyhexafluoropropylene chain segment accounts for 5 wt %, the weight-average molecular weight $M_w$=450000, the glass transition temperature is −55° C., and the solid content is 30 wt %, Arkema.

A method for testing performance parameters related to the following embodiments and comparison examples is as follows:

(1) Test of the surface density of a ceramic layer is: taking a membrane paper of 10 $cm^2$×10 $cm^2$ (a ceramic membrane before a heat-resistant fiber layer is formed) and a PE base membrane, weighing respective weights of m1 (mg) and m2 (mg) thereof, measuring respective membrane thicknesses of d1 (μm) and d2 (μm) thereof, where the surface density of the ceramic layer at a unit thickness=(m1−m2)×$\rho_{Al2O3}$/[10×10×(d1−d2)×$10^{-4}$×ρ], where $\rho_{Al2O3}$ is the true density of aluminum oxide, and p is the true density of used ceramic particles.

(2) Test of the air permeability (Gurley value) of the ceramic layer is: cutting the ceramic membrane into a ceramic membrane sample having an area of 6.45 $cm^2$, and measuring, by using a Gurley value tester GURLEY-4110 and at a pressure (height of water column) of 12.39 cm, the time (s/100 ml) required by gas (air) of 100 ml to permeate the foregoing ceramic membrane sample, where a smaller value thereof indicates better air permeability.

(3) Test of the peeling strength of the ceramic layer is: preparing, respectively according to respective processes of the following embodiments and comparison examples, a ceramic membrane including only a single-sided ceramic layer and not including a heat-resistant fiber layer and a bonding layer, tailoring a sample of 40 mm×100 mm from the ceramic membrane, respectively fixing two surfaces of the ceramic membrane onto a stationary fixture and a movable fixture by using an adhesive tape, and reversely stretching at 180° C. to peel the ceramic layer from a base material membrane, where if a larger pulling force is required, the peeling strength of the ceramic membrane is higher, to indicate that the bonding strength is higher.

(4) Test of the thermal stability of the ceramic membrane is: tailoring a ceramic membrane test sample of 5 cm×5 cm from the ceramic membrane, respectively placing the ceramic membrane test sample in an oven at 120° C. and 160° C., baking the ceramic membrane test sample for 1 hours, and comparing areas before and after the baking to determine a change, and taking a ratio of an area change value to an original area (shrinkage percentage) to measure the thermal stability of the ceramic membrane, where if the ratio does not exceed 5%, the thermal stability is A, and if the ratio is greater than 5%, the thermal stability is B.

(5) Method for measuring the glass transition temperature of the material of the heat-resistant fiber layer is: measuring the glass transition temperature by using a differential scanning calorimeter produced by Mettler-Toledo Corporation.

(6) Method for measuring the liquid absorption rate of the material of the heat-resistant fiber layer is: dissolving a to-be-measured material in a corresponding solvent, performing pouring to form a sample having a designated size (for example, a wafer whose diameter is 17 mm), performing drying, then weighing the sample of a mass m1 in a glove box (at 25° C.) full of argon, then immersing the sample in an electrolyte (the electrolyte contains a lithium salt $LiPF_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference) for 24 h, then taking out the sample, drying the liquid on the surface of the sample by using filter paper (not performing pressing processing), weighing the sample of a mass m2, and then calculating a corresponding liquid absorption rate according to a calculation formula: "liquid absorption rate= (m2−m1)/m1×100%".

(7) Test of the porosity of the heat-resistant fiber layer is: tailoring a heat-resistant fiber layer sample of a particular volume, weighing, then immersing the heat-resistant fiber layer sample □in n-butyl alcohol, and measuring the weight of the sample after adsorption and balancing, where the porosity=

$$\frac{\text{Mass after adsorption} - \text{Mass before adsorption}}{\rho_{isobutanol}\text{Sample volume}} \times 100\%.$$

(8) Test of the porosity of the bonding layer is: tailoring each of porous self-crosslinking polymer membranes Sb1, and Sb14 to Sb25 obtained in Embodiments 1 to 27 into a wafer whose diameter is 17 mm, weighing, then immersing a bonding layer sample in n-butyl alcohol for 2 h, then taking out the sample, drying liquid on the surface of the membrane by using filter paper, weighing the mass in this case, and calculating the porosity according to the following formula:

$$P(\%) = \frac{M - M_0}{\rho_{BuOH} \pi r^2 d} \times 100\%$$

where P is the porosity, $M_0$ is the mass (mg) of a dry membrane, M is the mass (mg) after immersion in the n-butyl alcohol for 2 h, r is the radius (mm) of the membrane, and d is the thickness (μm) of the membrane.

(9) Surface density of the bonding layer is: respectively taking a PE base membrane of 0.2 m×0.2 m and a PE base membrane containing the bonding layer, and weighing respective weights of $M_0$ (g) and M (g) thereof, where the surface density=[(M−$M_0$)/0.04] g/m².

(10) Test of the liquid absorption rate of the bonding layer is: tailoring each of porous self-crosslinking polymer membranes Sb1, and Sb14 to Sb25 obtained in Embodiments 1 to 27 into a wafer whose diameter is 17 mm, and then performing testing with reference to the foregoing method for measuring the liquid absorption rate of the material of the heat-resistant fiber layer.

(11) Test of the ion conductivity of the bonding layer is: tailoring, by using an alternating-current impedance test, each of porous self-crosslinking polymer membranes Sb1, and Sb14 to Sb25 obtained in Embodiments 1 to 27 into a wafer whose diameter is 17 mm, drying the wafer, then placing the wafer between two stainless steel (SS) electrodes, absorbing a sufficient amount of electrolyte (the electrolyte contains a lithium salt $LiPF_6$ (lithium hexafluorophosphate) and an organic solvent system, the content of the lithium salt is 1 mol/L, and the organic solvent system contains 32.5 wt % of EC (ethylene carbonate), 32.5 wt % of EMC (ethyl methyl carbonate), 32.5 wt % of DMC (dimethyl carbonate), and 2.5 wt % of VC (vinylene carbonate) by using 100 wt % of a total weight of the organic solvent system as a reference), sealing the electrolyte in a 2016-type button cell, and then performing an alternating-current impedance experiment, where an intersection point between a linear part and a real axis is the bulk resistance of the electrolyte, and therefore the ion conductivity of the bonding layer may be obtained as follows: σ=L/A·R (where L indicates the thickness (cm) of the bonding layer, A is the contact area (cm²) between a stainless steel plate and a membrane, and R is the bulk resistance (mS) of the electrolyte).

(12) Test of the mechanical strength is: testing, by using a universal testing machine (calibrated) of Shenzhen Junrui, the stretching and puncturing performance of a polymer composite membrane prepared in each of the foregoing embodiments.

(13) Test of the thermal shrinkage percentage is: tailoring a square sheet of 6 cm×6 cm from the polymer composite membrane prepared in the foregoing embodiment, placing the square sheet into an oven, respectively baking the square sheet for 1 h at 120° C., 140° C., 160° C., and 180° C., and measuring the length and the width of the square sheet. A formula of calculating the thermal shrinkage percentage is: thermal shrinkage percentage=(1−the length of the sample after thermal shrinkage/6)×100%.

(14) Test of the ion conductivity is: tailoring, by using an alternating-current impedance test, the polymer composite membrane prepared in each of the embodiments and the comparison examples into a wafer whose diameter is 17 mm, and testing the wafer. For the testing method, refer to the foregoing test of the ion conductivity of the bonding layer.

The following embodiments and comparison examples are used to comparatively describe beneficial effects of a polymer composite membrane prepared according to a method of the disclosure.

Embodiment 1

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane:

2 kg of aluminum oxide (whose average particle size is 400 nm), 0.01 kg of sodium polyacrylate (whose number-average molecular weight is 9000 and which is commercially available from Guangzhou Yuanchang Commerce Co., Ltd.), 0.024 kg of sodium carboxymethylcellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of aluminum oxide is 30 wt %, the mixture is stirred for 1.5 hours at 6000 rpm, then 0.02 kg of 3-glycidyloxypropyltrimethoxysilane is added to continue stirring for 1.5 hours, then 0.1 kg of polyacrylate binder (whose crosslinked monomer is N-methylolacrylamide, whose content is 4 wt %, and whose glass transition temperature is −20° C.) is added, stirring is performed for 1.5 hours at 3000 rpm, then 0.08 kg of sodium dodecylbenzenesulfonate is added, and then stirring is performed for 0.5 hour at 3000 rpm, to obtain a ceramic layer slurry.

The foregoing ceramic layer slurry is applied onto one side surface of a PE base membrane (which is commercially available from Japan SK Corporation and whose trade mark is BD1201, the same below) whose thickness is 12 μm, and drying is performed to obtain a ceramic layer whose thickness is 2.5 μm on the one side surface of the base membrane, to obtain a product, namely, a ceramic membrane C1. Through testing, the surface density of the ceramic layer of the ceramic membrane C1 at the thickness of 1 μm is 2.11 mg/cm², the air permeability is 202 s/100 ml, the peeling strength is 5.4 N, the thermal stability at 120° C. is A, and the thermal stability at 160° C. is A.

(2) Prepare a heat-resistant fiber layer:

mixtureing polyetherimide (which is ultem 1000 commercially available from SABIC Innovative Plastics (Shanghai) Co., Ltd., and whose melting point is 370° C. to 410° C. and glass transition temperature is 215° C., the same below) and polyvinylidene fluoride-hexafluoropropylene (which is commercially available from Arkema Investment Co., Ltd., and whose weight-average molecular weight is 450000 g/mol, melting point is 152° C., glass transition temperature is −40° C., and liquid absorption rate in an electrolyte at 25° C. is 45%, the same below) according to a weight ratio 1:1, stirring the two polymers evenly in a mixtureing manner through mechanical stirring at a stirring speed of 1200 rpm, mixtureing the two polymers for 2 h to obtain a mixture, adding the foregoing mixture into NMP, magnetically stirring the N-methyl-2-pyrrolidinone in water bath of 70° C. to fully dissolve the mixture, to form a spinning solution whose concentration is 30 wt %.

The foregoing prepared ceramic membrane C1 (whose ceramic layer is outward) wraps a roller (a collection device), and on a surface of the ceramic layer of the ceramic membrane C1, electrostatic spinning is performed on the foregoing spinning solution by using a needle electrostatic spinning method. Parameters for adjusting electrostatic spinning are as follows: the receiving distance is 12 cm, the temperature is 25° C., the humidity is 20%, the inner diameter of a needle is 0.46 mm, a movement speed of the needle is 6.6 mm/sec, the voltage is 10 kV, the stream velocity is 0.3 mL/h, and the rotational speed of the roller is 2000 rpm.

After electrostatic spinning ends, the foregoing PE base membrane is taken down, mould pressing is performed for 5 min at a pressure of 10 MPa, and then air blowing and drying are performed for 24 h at 50° C., to obtain a polymer composite membrane F1 on which a heat-resistant fiber layer (whose thickness is 3 μm and porosity is 85%) is formed.

The diameter of the fiber in the SEM image is measured by using TEM Macrography software, data is recorded, the finally calculated average fiber diameter is 210 nm, and calculation is performed according to the gravimetric method to learn that the surface density of the heat-resistant fiber layer is 1.23 g/m². Through testing, the transverse stretching strength and the longitudinal stretching strength of the polymer composite membrane F1 are respectively 115 Mpa and 120 MPa, the needling strength is 0.544 kgf, and the ion conductivity is 7.8 mS/cm. Moreover, the polymer composite membrane is baked for 1 h at 120° C., 140° C., 160° C., and 180° C., transverse thermal contraction percentages are respectively: 0%, 0%, 1.2%, and 3.5%, and longitudinal thermal contraction percentages are respectively: 0%, 0.05%, 2.2%, and 5%.

(3) Prepare a bonding layer:

A self-crosslinking pure acrylic emulsion (which is commercially available from Shanghai Aigao Chemical Co., Ltd. and whose trade mark is 1040), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is S601) whose solid contents are in a mass ratio of 9:1:10 are mixed, an appropriate amount of water is added, and stirring is performed evenly to prepare a slurry whose total solid content is 1 wt %.

The foregoing slurry is sprayed onto a surface of the heat-resistant fiber layer of the polymer composite membrane F1 and a side surface of a PTFE plate by using a spraying method (the spraying temperature is 40° C.), and then drying is performed at 50° C., to respectively obtain a polymer composite membrane Sa1 including a bonding layer (porous self-crosslinking polymer membrane, the same below) and a porous self-crosslinking polymer membrane Sb1 on the PTFE plate, where the single-sided surface density of the bonding layer is 0.1 g/m², and the single-sided thickness is 0.2 μm. Moreover, through testing, the porosity of the foregoing prepared Sb1 is 62%, the liquid absorption rate is 263%, and the conductivity is 8.33 mS/cm. Through testing, the ion conductivity of the foregoing prepared polymer composite membrane Sa1 is 8.3 mS/cm.

Comparison Example 1

This comparison example is an independent comparison example of a PE base membrane, and is used to comparatively describe a polymer composite membrane and a method for preparing same provided in the disclosure.

(1) APE membrane that is commercially available from Japan SK Corporation and whose trade mark is BD1201 is used as a comparison sample, and is marked as DF1 (whose thickness is 12 µm and porosity is 45%).

(2) Through testing, the transverse stretching strength and the longitudinal stretching strength of the PE membrane are respectively 150 Mpa and 152 MPa, the needling strength is 0.501 kgf, and the ion conductivity is 7.9 mS/cm. Moreover, the PE membrane is baked for 1 h at 120° C., 140° C., 160° C., and 180° C., transverse thermal shrinkage percentages are respectively: 70%, 95%, 95%, and 95%, and longitudinal thermal shrinkage percentages are respectively: 75.2%, 96%, 96%, and 96%.

Comparison Example 2

This comparison example is an independent comparison example of a ceramic membrane including a PE base membrane and a ceramic layer, and is used to comparatively describe a polymer composite membrane and a method for preparing same provided in the disclosure.

(1) Method for preparing a ceramic membrane: the same as the method (1) for preparing a ceramic membrane in Embodiment 1, and the obtained ceramic membrane is marked as DF2 (that is, the ceramic membrane C1 obtained in Embodiment 1).

(2) Structure and performance representation of the polymer composite membrane:

Through testing, the transverse stretching strength and the longitudinal stretching strength of the polymer composite membrane DF2 are respectively 132 Mpa and 145 MPa, the needling strength is 0.512 kgf, and the ion conductivity is 7.8 mS/cm. Moreover, the polymer composite membrane DF2 is baked for 1 h at 120° C., 140° C., 160° C., and 180° C., transverse thermal shrinkage percentages are respectively: 0.3%, 1%, 6.5%, and 86%, and longitudinal thermal shrinkage percentages are respectively: 0.5%, 1.5%, 5.5%, and 82.2%.

Comparison Example 3

This comparison example, for preparing a polymer composite membrane of a four-layered structure of PE base membrane-ceramic layer-heat-resistant fiber layer-bonding layer, is used to comparatively describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, a spinning solution whose concentration is 30 wt % is formed by adding polyetherimide into an NMP solution, and magnetically stirring the solution in water bath at 70° C. to fully dissolve the polyetherimide, and a polymer composite membrane DF3 on which a heat-resistant fiber layer is formed (the thickness of the heat-resistant fiber layer is 3 and the porosity is 82%) is further obtained through electrostatic spinning. The diameter of the fiber in the SEM image is measured by using TEM Macrography software, data is recorded, the finally calculated average fiber diameter is 189 nm, and calculation is performed according to the gravimetric method to learn that the surface density of the heat-resistant fiber layer is 1.22 g/m². Fiber filaments in the obtained fiber layer are quite easily separated or disengaged from each other, and consequently application is difficult. Through testing, the transverse stretching strength and the longitudinal stretching strength of the polymer composite membrane DF2 are respectively 128 Mpa and 132 MPa, the needling strength is 0.52 kgf, and the ion conductivity is 7.8 mS/cm. Moreover, the polymer composite membrane DF2 is baked for 1 h at 120° C., 140° C., 160° C., and 180° C., transverse thermal shrinkage percentages are respectively: 0%, 0.03%, 1%, and 3.2%, and longitudinal thermal shrinkage percentages are respectively: 0%, 0.04%, 2%, and 4.5%.

(3) Prepare a bonding layer: with reference to Embodiment 1, a difference is in that, a bonding layer is formed on the foregoing prepared polymer composite membrane DF3 by using the method in Embodiment 1, to obtain a polymer composite membrane Da1. Through testing, the ion conductivity of the foregoing prepared polymer composite membrane Da1 is 8.28 mS/cm.

Comparison Example 4

This comparison example, for preparing a polymer composite membrane of a four-layered structure of PE base membrane-ceramic layer-heat-resistant fiber layer-bonding layer, is used to comparatively describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, a spinning solution is a spinning solution whose concentration is 30 wt % formed by adding polyvinylidene fluoride-hexafluoropropylene into an NMP solution, magnetically stirring the solution in water bath at 70° C. to fully dissolve the polyvinylidene fluoride-hexafluoropropylene, and a polymer composite membrane DF4 on which a heat-resistant fiber layer is formed (the thickness of the heat-resistant fiber layer is 3 µm, and the porosity is 83.5%) is further obtained through electrostatic spinning. The diameter of the fiber in the SEM image is measured by using TEM Macrography software, data is recorded, the finally calculated average fiber diameter is 129 nm, and calculation is performed according to the gravimetric method to learn that the surface density of the heat-resistant fiber layer is 1.07 g/m². Through testing, the transverse stretching strength and the longitudinal stretching strength of the polymer composite membrane DF4 are respectively 105 Mpa and 113 MPa, the needling strength is 0.515 kgf, and the ion conductivity is 8.3 mS/cm. Moreover, the polymer composite membrane DF4 is baked for 1 h at 120° C., 140° C., 160° C., and 180° C., transverse thermal shrinkage percentages are respectively: 0.2%, 0.8%, 6.2%, and 80%, and longitudinal thermal shrinkage percentages are respectively: 0.4%, 1.3%, 5.2%, and 81.6%.

(3) Prepare a bonding layer: with reference to Embodiment 1, a difference is in that, a bonding layer is formed on the foregoing prepared polymer composite membrane DF4 by using the method in Embodiment 1, to obtain a polymer composite membrane Da2. Through testing, the ion conductivity of the foregoing prepared polymer composite membrane Da2 is 8.35 mS/cm.

Comparison Example 5

This comparison example, for preparing a polymer composite membrane of a four-layered structure of PE base membrane-ceramic layer-heat-resistant fiber layer-bonding layer, is used to comparatively describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, a spinning solution whose concentration is 30 wt % is prepared by mixtureing polyvinylidene fluoride (which is commercially available from Arkema Co., Ltd. and whose weight-average molecular weight is 1000000 g/mol, melting point is 172° C., and liquid absorption rate in an electrolyte at 25° C. is 25%) in place of polyvinylidene fluoride-hexafluoropropylene and polyetherimide, and a polymer composite membrane DF5 on which a heat-resistant fiber layer (whose thickness is 3 μm and porosity is 83%) is formed is further obtained through electrostatic spinning. The diameter of the fiber in the SEM image is measured by using TEM Macrography software, data is recorded, the finally calculated average fiber diameter is 129 nm, and calculation is performed according to the gravimetric method to learn that the surface density of the heat-resistant fiber layer is 1.07 g/m$^2$. Through testing, the transverse stretching strength and the longitudinal stretching strength of the polymer composite membrane DF5 are respectively 114 Mpa and 118 MPa, the needling strength is 0.53 kgf, and the ion conductivity is 7.6 mS/cm. Moreover, the polymer composite membrane DF5 is baked for 1 h at 120° C., 140° C., 160° C., and 180° C., transverse thermal shrinkage percentages are respectively: 4.8%, 6.6%, 10.5%, and 28.6%, and longitudinal thermal shrinkage percentages are respectively: 4.6%, 7%, 10.8%, and 28.7%.

(3) Prepare a bonding layer: with reference to Embodiment 1, a difference is in that, a bonding layer is formed on the foregoing prepared polymer composite membrane DF5 by using the method in Embodiment 1, to obtain a polymer composite membrane Da3. Through testing, the ion conductivity of the foregoing prepared polymer composite membrane Da3 is 8.18 mS/cm.

Implementation Comparison Example of a Bonding Layer

This comparison example, for preparing a polymer composite membrane of a four-layered structure of PE base membrane-ceramic layer-heat-resistant fiber layer-bonding layer, is used to comparatively describe a polymer composite membrane and a method for preparing same provided in the disclosure.

This embodiment is a comparison embodiment, and is used to describe a polymer composite membrane when a bonding layer is a non-optional bonding layer and a method for preparing same.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer: with reference to Embodiment 1, and a difference is in that, a method for forming a bonding layer is a blade coating method, and a polymer composite membrane Da4 including a bonding layer (compact self-crosslinking polymer membrane) and a porous self-crosslinking polymer membrane Db4 on a PTFE plate are respectively obtained, where the single-sided surface density of the bonding layer is 1 g/m$^2$, and the single-sided thickness is 2 Through testing, the porosity of the foregoing prepared porous self-crosslinking polymer membrane Db4 is 0%, the liquid absorption rate is 156%, and the conductivity is 5.25 mS/cm. Through testing, the ion conductivity of the foregoing prepared polymer composite membrane Da4 is 5.05 mS/cm.

Embodiment 2

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, polyetherimide and polyvinylidene fluoride-hexafluoropropylene in the prepared mixture are mixtureed according to a weight ratio 3:1. A polymer composite membrane marked as F2 on which a heat-resistant fiber layer is formed is obtained (the thickness of the heat-resistant fiber layer is 3 and the porosity is 84.2%).

The diameter of the fiber in the SEM image is measured by using TEM Macrography software, data is recorded, the finally calculated average fiber diameter is 186 nm, and calculation is performed according to the gravimetric method to learn that the surface density of the heat-resistant fiber layer is 1.22 g/m$^2$. Through testing, the transverse stretching strength and the longitudinal stretching strength of the polymer composite membrane F2 are respectively 124 Mpa and 129 MPa, the needling strength is 0.543 kgf, and the ion conductivity is 7.5 mS/cm. Moreover, the polymer composite membrane F2 is baked for 1 h at 120° C., 140° C., 160° C., and 180° C., transverse thermal shrinkage percentages are respectively: 0%, 0%, 1.5%, and 3.5%, and longitudinal thermal shrinkage percentages are respectively: 0%, 0%, 2.2%, and 4.5%.

(3) Prepare a bonding layer: with reference to Embodiment 1, a difference is in that, the polymer composite membrane F1 is replaced with the foregoing polymer composite membrane F2, to obtain a polymer composite membrane Sa2 including a bonding layer (compact self-crosslinking polymer membrane, the same as that in Embodiment 1). Through testing, the ion conductivity of the foregoing prepared polymer composite membrane Sa2 is 8.05 mS/cm.

Embodiment 3

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, polyetherimide and polyvinylidene fluoride-hexafluoropropylene in the prepared mixture are mixtureed according to a weight ratio 5:1. A polymer composite membrane marked as F3 on which a heat-resistant fiber layer is formed is obtained (the thickness of the heat-resistant fiber layer is 3 μm, and the porosity is 83%).

The diameter of the fiber in the SEM image is measured by using TEM Macrography software, data is recorded, the finally calculated average fiber diameter is 186 nm, and calculation is performed according to the gravimetric method to learn that the surface density of the first heat-resistant fiber layer is 1.22 g/m$^2$. Through testing, the transverse stretching strength and the longitudinal stretching strength of the polymer composite membrane F3 are respectively 125 Mpa and 129 MPa, the needling strength is 0.543 kgf, and the ion conductivity is 6.9 mS/cm. Moreover, the polymer composite membrane F3 is baked for 1 h at 120° C., 140° C., 160° C., and 180° C., transverse thermal shrinkage percentages are respectively: 0%, 0.5%, 2.5%, and 3.6%, and longitudinal thermal shrinkage percentages are respectively: 0%, 1.3%, 3%, and 4.6%.

(3) Prepare a bonding layer: with reference to Embodiment 1, a difference is in that, the polymer composite membrane F1 is replaced with the foregoing polymer composite membrane F3, to obtain a polymer composite membrane Sa3 including a bonding layer (compact self-cross-linking polymer membrane, the same as that in Embodiment 1). Through testing, the ion conductivity of the foregoing prepared polymer composite membrane Sa3 is 7.6 mS/cm.

Embodiment 4

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, polyetherimide and polyvinylidene fluoride-hexafluoropropylene in the prepared mixture are mixtureed according to a weight ratio 10:1. A polymer composite membrane marked as F4 on which a heat-resistant fiber layer is formed is obtained (the thickness of the heat-resistant fiber layer is 3 μm, and the porosity is 86.4%).

The diameter of the fiber in the SEM image is measured by using TEM Macrography software, data is recorded, the finally calculated average fiber diameter is 222 nm, and calculation is performed according to the gravimetric method to learn that the surface density of the heat-resistant fiber layer is 1.19 g/m². Through testing, the transverse stretching strength and the longitudinal stretching strength of the polymer composite membrane F4 are respectively 121 Mpa and 125 MPa, the needling strength is 0.564 kgf, and the ion conductivity is 7.3 mS/cm. Moreover, the polymer composite membrane F4 is baked for 1 h at 120° C., 140° C., 160° C., and 180° C., transverse thermal shrinkage percentages are respectively: 0%, 0.5%, 3.5%, and 5.5%, and longitudinal thermal shrinkage percentages are respectively: 0%, 1.3%, 3%, and 7.5%. In the polymer composite membrane F4, because the porosity is increased, the ion conductivity thereof is improved. However, because the content of polyvinylidene fluoride-hexafluoropropylene is relatively low, the viscosity of the formed heat-resistant fiber layer is deteriorated. As a result, the stretching performance of the polymer composite membrane F4 is weakened, and the thermal shrinkage performance is also reduced.

(3) Prepare a bonding layer: with reference to Embodiment 1, a difference is in that, the polymer composite membrane F1 is replaced with the foregoing polymer composite membrane F4, to obtain a polymer composite membrane Sa4 including a bonding layer (compact self-cross-linking polymer membrane, the same as that in Embodiment 1). Through testing, the ion conductivity of the foregoing prepared polymer composite membrane Sa4 is 7.8 mS/cm.

Embodiment 5

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: with reference to Embodiment 1, a difference is in that, the foregoing polyvinylidene fluoride-hexafluoropropylene is replaced with polyethylene oxide (which is commercially available from Aladdin Corporation, and whose weight-average molecular weight is 600000 g/mol, melting point is 130° C., glass transition temperature is −62° C., and liquid absorption rate in an electrolyte at 25° C. is 1000%). A polymer composite membrane F5 on which a heat-resistant fiber layer is formed is obtained (the thickness of the heat-resistant fiber layer is 3 and the porosity is 85%).

The diameter of the fiber in the SEM image is measured by using TEM Macrography software, data is recorded, the finally calculated average fiber diameter is 230 nm, and calculation is performed according to the gravimetric method to learn that the surface density of the heat-resistant fiber layer is 1.30 g/m². Through testing, the transverse stretching strength and the longitudinal stretching strength of the polymer composite membrane F5 are respectively 123 Mpa and 137 MPa, the needling strength is 0.529 kgf, and the ion conductivity is 7.9 mS/cm. Moreover, the polymer composite membrane F5 is baked for 1 h at 120° C., 140° C., 160° C., and 180° C., transverse thermal shrinkage percentages are respectively: 0%, 1.5%, 3%, and 8.6%, and longitudinal thermal shrinkage percentages are respectively: 0%, 1.15%, 2.5%, and 8.3%.

(3) Prepare a bonding layer: with reference to Embodiment 1, a difference is in that, the polymer composite membrane F1 is replaced with the foregoing polymer composite membrane F5, to obtain a polymer composite membrane Sa5 including a bonding layer (compact self-cross-linking polymer membrane, the same as that in Embodiment 1). Through testing, the ion conductivity of the foregoing prepared polymer composite membrane Sa5 is 8.32 mS/cm.

Embodiment 6

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: Polyetherimide is added into an NMP solution, the solution is magnetically stirred in water bath at 70° C. to fully dissolve the polyetherimide, to form a spinning solution A whose concentration is 30 wt %; and polyvinylidene fluoride-hexafluoropropylene is added into an NMP solution, the solution is magnetically stirred in water bath at 70° C. to fully dissolve the polyvinylidene fluoride-hexafluoropropylene, to form a spinning solution B whose concentration is 30 wt %.

A side surface of the foregoing prepared polymer composite membrane C1 wraps a roller (a collection device), and on a surface of the polymer composite membrane C1 on which a ceramic layer is formed, electrostatic spinning is performed on the spinning solution A and the spinning solution B by using a needle electrostatic spinning method, where a weight ratio of polyetherimide in the spinning solution A to polyvinylidene fluoride-hexafluoropropylene in the spinning solution B is 1:1. Parameters for adjusting electrostatic spinning are as follows: the receiving distance is 12 cm, the temperature is 25° C., the humidity is 50%, the inner diameter of a needle is 0.46 mm, a movement speed of the needle is 6.6 mm/sec, the voltage is 10 kV, the stream velocity is 0.3 mL/h, and the rotational speed of the roller is 2000 rpm.

After electrostatic spinning ends, the foregoing ceramic membrane is taken down, mould pressing is performed for 1 min at a pressure of 15 MPa, and then air blowing and drying are performed for 24 h at 50° C., to obtain a polymer composite membrane F6 on which a heat-resistant fiber layer (whose thickness is 3 μm and porosity is 81.3%) is formed.

The diameter of the fiber in the SEM image is measured by using TEM Macrography software, data is recorded, the finally calculated average fiber diameter is 246 nm, and calculation is performed according to the gravimetric method to learn that the surface density of the heat-resistant fiber layer is 1.31 g/m². Through testing, the transverse stretching strength and the longitudinal stretching strength of the polymer composite membrane F6 are respectively 118 Mpa and 122 MPa, the needling strength is 0.544 kgf, and the ion conductivity is 7.6 mS/cm. Moreover, the polymer composite membrane F6 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

(3) Prepare a bonding layer: with reference to Embodiment 1, a difference is in that, the polymer composite membrane F1 is replaced with the foregoing polymer composite membrane F6, to obtain a polymer composite membrane Sa6 including a bonding layer (compact self-crosslinking polymer membrane, the same as that in Embodiment 1). Through testing, the ion conductivity of the foregoing prepared polymer composite membrane Sa6 is 8.1 mS/cm.

Embodiment 7

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Method for preparing a ceramic membrane:

2 kg of boehmite (whose average particle size is 300 nm), 0.016 kg of sodium polyacrylate (whose number-average molecular weight is 9000 and which is commercially available from Guangzhou Yuanchang Commerce Co., Ltd.), 0.014 kg of sodium carboxymethyl nano-crystalline cellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of boehmite is 50 wt %, the mixture is stirred for 1.5 hours at 8000 rpm, then 0.01 kg of 3-glycidyloxypropyltrimethoxysilane is added to continue stirring for 1.5 hours, then 0.12 kg of polyacrylate binder (whose crosslinked monomer is N-methylolacrylamide, whose content is 3 wt %, and whose glass transition temperature is −40° C.) is added, stirring is performed for 1.5 hours at 3000 rpm, then 0.08 kg of sodium dodecylbenzenesulfonate is added, and stirring is performed for 1.5 hours at 3000 rpm, to obtain a ceramic layer slurry.

The foregoing ceramic layer slurry is applied onto one side surface of a PE base membrane whose thickness is 12 μm, and drying is performed to obtain a ceramic layer whose thickness is 2 μm on the one side surface of the base membrane, to obtain a product, namely, a ceramic membrane C2. Through testing, the surface density of the ceramic layer of the ceramic membrane C2 at the thickness of 1 μm is 2.02 mg/cm², the air permeability is 198 s/100 ml, the peeling strength is 5.6 N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C2, to obtain a polymer composite membrane marked as F7 on which a heat-resistant fiber layer (whose thickness is 3 μm and porosity is 79%) is formed. Through testing, the transverse stretching strength and the longitudinal stretching strength of the polymer composite membrane F7 are respectively 120 Mpa and 125 MPa, the needling strength is 0.544 kgf, and the ion conductivity is 7.8 mS/cm. Moreover, the polymer composite membrane F7 is baked for 1 h at 120° C., 140° C., 160° C., and 180° C., transverse thermal shrinkage percentages are respectively: 0%, 0%, 1.3%, and 3.8%, and longitudinal thermal shrinkage percentages are respectively: 0%, 0.05%, 2.3%, and 5.35%.

(3) Prepare a bonding layer: with reference to Embodiment 1, a difference is in that, the polymer composite membrane F1 is replaced with the foregoing polymer composite membrane F7, to obtain a polymer composite membrane Sa7 including a bonding layer (compact self-crosslinking polymer membrane, the same as that in Embodiment 1). Through testing, the ion conductivity of the foregoing prepared polymer composite membrane Sa7 is 8.26 mS/cm.

Embodiment 8

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a Polymer Composite Membrane:

2 kg of titanium dioxide (whose average particle size is 500 nm), 0.008 kg of sodium polyacrylate (whose number-average molecular weight is 9000 and which is commercially available from Guangzhou Yuanchang Commerce Co., Ltd.), 0.03 kg of sodium carboxymethyl nano-crystalline cellulose (whose viscosity in an aqueous solution of 1 wt % is 2500 to 3000 mPa·s, which is commercially available from Xinxiang Heluelida Power Material Co., Ltd., and whose trade mark is BTT-3000), and water are mixed evenly, to obtain a mixture in which the solid content of titanium dioxide is 25 wt %, the mixture is stirred for 1.5 hours at 4000 rpm, then 0.024 kg of 3-glycidyloxypropyltrimethoxysilane is added to continue stirring for 1.5 hours, then 0.08 kg of polyacrylate binder (whose crosslinked monomer is hydroxymethyl acrylate, whose content is 5 wt %, and whose glass transition temperature is 0° C.) is added, stirring is performed for 1.5 hours at 3000 rpm, then 0.08 kg of sodium dodecylbenzenesulfonate is added, and stirring is performed for 1.5 hours at 3000 rpm, to obtain a ceramic layer slurry.

The foregoing ceramic layer slurry is applied onto one side surface of a PE base membrane whose thickness is 12 μm, and drying is performed to obtain a ceramic layer whose thickness is 3.5 μm on the one side surface of the base membrane, to obtain a product, namely, a ceramic membrane C3. Through testing, the surface density of the ceramic layer of the ceramic membrane C3 at the thickness of 1 μm is 2.05 mg/cm², the air permeability is 200 s/100 ml, the peeling strength is 5.7 N, the thermal stability at 120° C. is A, and the thermal stability at 160° C. is A.

(2) Prepare a heat-resistant fiber layer: with reference to Embodiment 1, a difference is in that, the polymer composite membrane C1 is replaced with the foregoing prepared polymer composite membrane C3, to obtain a polymer composite membrane marked as F8 on which a heat-resistant fiber layer (whose thickness is 3 μm and porosity is 81.5%) is formed. Through testing, the transverse stretching strength and the longitudinal stretching strength of the polymer composite membrane F8 are respectively 113 Mpa and 118 MPa, the needling strength is 0.544 kgf, and the ion conductivity is 7.7 mS/cm. Moreover, the polymer composite membrane F8 is baked for 1 h at 120° C., 140° C., 160° C., and 180° C., transverse thermal shrinkage percentages are respectively: 0%, 0%, 1.3%, and 3.6%, and longitudinal thermal shrinkage percentages are respectively: 0%, 0.06%, 2.3%, and 5.3%.

(3) Prepare a bonding layer: with reference to Embodiment 1, a difference is in that, the polymer composite membrane F1 is replaced with the foregoing polymer composite membrane F8, to obtain a polymer composite membrane Sa8 including a bonding layer (compact self-crosslinking polymer membrane, the same as that in Embodiment 1). Through testing, the ion conductivity of the foregoing prepared polymer composite membrane Sa8 is 8.21 mS/cm.

Embodiment 9

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: with reference to Embodiment 1, a difference is in that, when a ceramic layer slurry is prepared, the use amount of a polyacrylate binder is 0.131b, and the content of a crosslinked monomer in the polyacrylate binder is 7 wt %, to obtain a ceramic membrane C4. Through testing, the surface density of the ceramic layer of the ceramic membrane C4 is 1.95 mg/cm$^2$, the air permeability is 208 s/100 ml, the peeling strength is 4.3 N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C4, to obtain a polymer composite membrane F9 on which a heat-resistant fiber layer is formed. Through testing, the transverse stretching strength and the longitudinal stretching strength of the polymer composite membrane F9 are respectively 115 Mpa and 121 MPa, the needling strength is 0.544 kgf, and the ion conductivity is 7.6 mS/cm. Moreover, the polymer composite membrane F9 is baked for 1 h at 120° C., 140° C., 160° C., and 180° C., transverse thermal shrinkage percentages are respectively: 0%, 0%, 1.7%, and 4.0%, and longitudinal thermal shrinkage percentages are respectively: 0%, 0.08%, 2.5%, and 5.5%.

(3) Prepare a bonding layer: with reference to Embodiment 1, a difference is in that, the polymer composite membrane F1 is replaced with the foregoing polymer composite membrane F9, to obtain a polymer composite membrane Sa9 including a bonding layer (compact self-crosslinking polymer membrane, the same as that in Embodiment 1). Through testing, the ion conductivity of the foregoing prepared polymer composite membrane Sa9 is 8.12 mS/cm.

Embodiment 10

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: with reference to Embodiment 1, a difference is in that, when a ceramic layer slurry is prepared, the use amount of a polyacrylate binder is 0.12 kg, the content of a crosslinked monomer in the polyacrylate binder is 5 wt %, and 3-glycidyloxypropyltrimethoxysilane is not added, to obtain a ceramic membrane C5. Through testing, the surface density of the ceramic layer of the ceramic membrane C5 is 1.91 mg/cm$^2$, the air permeability is 212 s/100 ml, the peeling strength is 4.5 N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C5, to obtain a polymer composite membrane F10 on which a heat-resistant fiber layer is formed. Through testing, the transverse stretching strength and the longitudinal stretching strength of the polymer composite membrane F10 are respectively 116 Mpa and 120 MPa, the needling strength is 0.544 kgf, and the ion conductivity is 7.5 mS/cm. Moreover, the polymer composite membrane F10 is baked for 1 h at 120° C., 140° C., 160° C., and 180° C., transverse thermal shrinkage percentages are respectively: 0%, 0.08%, 2.3%, and 4.2%, and longitudinal thermal shrinkage percentages are respectively: 0%, 0.1%, 2.6%, and 5.8%.

(3) Prepare a bonding layer: with reference to Embodiment 1, a difference is in that, the polymer composite membrane F1 is replaced with the foregoing polymer composite membrane F10, to obtain a polymer composite membrane Sa10 including a bonding layer (compact self-crosslinking polymer membrane, the same as that in Embodiment 1). Through testing, the ion conductivity of the foregoing prepared polymer composite membrane Sa10 is 8.04 mS/cm.

Embodiment 11

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: with reference to Embodiment 1, a difference is in that, when a ceramic layer slurry is prepared, the use amount of a polyacrylate binder is 0.181b, and the content of a crosslinked monomer in the polyacrylate binder is 2 wt %, to obtain a ceramic membrane C6. Through testing, the surface density of the ceramic layer of the ceramic membrane C6 is 2 mg/cm$^2$, the air permeability is 207 s/100 ml, the peeling strength is 4.6 N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C6, to obtain a polymer composite membrane F11 on which a heat-resistant fiber layer is formed. Through testing, the transverse stretching strength and the longitudinal stretching strength of the polymer composite membrane F11 are respectively 115 Mpa and 122 MPa, the needling strength is 0.544 kgf, and the ion conductivity is 7.4 mS/cm. Moreover, the polymer composite membrane F11 is baked for 1 h at 120° C., 140° C., 160° C., and 180° C., transverse thermal shrinkage percentages are respectively: 0%, 0%, 1.9%, and 4.5%, and longitudinal thermal shrinkage percentages are respectively: 0%, 0.05%, 2.2%, and 5.5%.

(3) Prepare a bonding layer: with reference to Embodiment 1, a difference is in that, the polymer composite membrane F1 is replaced with the foregoing polymer composite membrane F11, to obtain a polymer composite membrane Sa11 including a bonding layer (compact self-crosslinking polymer membrane, the same as that in Embodiment 1). Through testing, the ion conductivity of the foregoing prepared polymer composite membrane Sa11 is 7.89 mS/cm.

Embodiment 12

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: with reference to Embodiment 1, a difference is in that, the average particle size of aluminum oxide is 700 nm, and a ceramic membrane C7 is obtained. Through testing, the surface density of the ceramic layer of the ceramic membrane C7 is 2.11 mg/cm$^2$, the air permeability is 205 s/100 ml, the peeling strength is 4.7N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C7, to obtain a polymer composite membrane F12 on which a heat-resistant fiber layer is formed. Through testing, the transverse stretching strength and the longitudinal stretching strength of the polymer composite membrane F12 are respectively 116 Mpa and 120 MPa, the needling strength is 0.544 kgf, and the ion conductivity is 7.2 mS/cm. Moreover, the polymer composite membrane F12 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

(3) Prepare a bonding layer: with reference to Embodiment 1, a difference is in that, the polymer composite membrane F1 is replaced with the foregoing polymer composite membrane F12, to obtain a polymer composite membrane Sa12 including a bonding layer (compact self-crosslinking polymer membrane, the same as that in Embodiment 1). Through testing, the ion conductivity of the foregoing prepared polymer composite membrane Sa12 is 7.6 mS/cm.

Embodiment 13

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: with reference to Embodiment 1, a difference is in that, the average particle size of aluminum oxide is 250 nm, and a ceramic membrane C8 is obtained. Through testing, the surface density of the ceramic layer of the ceramic membrane C8 is 1.91 mg/cm$^2$, the air permeability is 208 s/100 ml, the peeling strength is 4.8N, the thermal stability at 120° C. is A, and the thermal stability at 160° C. is A.

(2) Prepare a heat-resistant fiber layer: with reference to Embodiment 1, a difference is in that, the ceramic membrane C1 is replaced with the foregoing prepared ceramic membrane C8, to obtain a polymer composite membrane F13 on which a heat-resistant fiber layer is formed. Through testing, the transverse stretching strength and the longitudinal stretching strength of the polymer composite membrane F13 are respectively 115 Mpa and 124 MPa, the needling strength is 0.544 kgf, and the ion conductivity is 7.0 mS/cm. Moreover, the polymer composite membrane F13 is baked for 1 h at 120° C., 140° C., 160° C., and 180° C., transverse thermal shrinkage percentages are respectively: 0%, 0%, 1.5%, and 3.8%, and longitudinal thermal shrinkage percentages are respectively: 0%, 0.08%, 2.4%, and 5.2%.

(3) Prepare a bonding layer: with reference to Embodiment 1, a difference is in that, the polymer composite membrane F1 is replaced with the foregoing polymer composite membrane F13, to obtain a polymer composite membrane Sa13 including a bonding layer (compact self-crosslinking polymer membrane, the same as that in Embodiment 1). Through testing, the ion conductivity of the foregoing prepared polymer composite membrane Sa13 is 7.25 mS/cm.

Embodiment 14

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

This embodiment is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A copolymer emulsion of vinylidene fluoride and hexafluoropropylene (which is commercially available from Arkema and whose trade mark is 10278), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is S601) whose solid contents are in a mass ratio of 12:4:4 are mixed, and an appropriate amount of water is added, and stirring is performed evenly to prepare a bonding layer slurry whose total solid content is 5 wt %.

The foregoing bonding layer slurry is printed onto a surface of the heat-resistant fiber layer of the polymer composite membrane F1 and a side surface of a PTFE plate by using a screen-printing method (the temperature is 75° C.), and then drying is performed at 50° C., to respectively obtain a polymer composite membrane Sa14 including a bonding layer and a porous self-crosslinking polymer membrane Sb14 on the PTFE plate, where the single-sided surface density of the bonding layer is 0.2 g/m$^2$, and the single-sided thickness is 0.4 μm.

Through testing, the porosity of the foregoing prepared Sb14 is 48%, the liquid absorption rate is 192%, and the conductivity is 7.52 mS/cm. Through testing, the ion conductivity of the foregoing prepared polymer composite membrane Sa14 is 7.42 mS/cm.

Embodiment 15

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

This embodiment is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is S601) whose solid contents are in a mass ratio of 12:6:1:1 are mixed, and an appropriate amount of water is added, and stirring is performed evenly to prepare a bonding layer slurry whose total solid content is 10 wt %.

The foregoing bonding layer slurry is sprayed onto a surface of the heat-resistant fiber layer of the polymer composite membrane F1 and a side surface of a PTFE plate by using a spraying method (the temperature is 58° C.), and then drying is performed at 50° C., to respectively obtain a polymer composite membrane Sa15 including a bonding layer and a porous self-crosslinking polymer membrane Sb15 on the PTFE plate, where the single-sided surface density of the bonding layer is 0.3 g/m², and the single-sided thickness is 0.3 μm.

Through testing, the porosity of the foregoing prepared bonding layer Sb15 is 51%, the liquid absorption rate is 300%, and the conductivity is 7.14 mS/cm. Through testing, the ion conductivity of the foregoing prepared polymer composite membrane Sa15 is 7.04 mS/cm.

Embodiment 16

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 12.7:6.3:1 are mixed, and an appropriate amount of water is added, and stirring is performed evenly to prepare a bonding layer slurry whose total solid content is 1 wt %.

The foregoing bonding layer slurry is printed onto a surface of the heat-resistant fiber layer of the polymer composite membrane F1 and a side surface of a PTFE plate by using a screen-printing method (the temperature is 40° C.), and then drying is performed at 50° C., to respectively obtain a polymer composite membrane Sa16 including a bonding layer and a porous self-crosslinking polymer membrane Sb16 on the PTFE plate, where the single-sided surface density of the bonding layer is 0.1 g/m², and the single-sided thickness is 0.2 μm.

Through testing, the porosity of the foregoing prepared porous self-crosslinking polymer membrane Sb16 is 53%, the liquid absorption rate is 311%, and the conductivity is 7.52 mS/cm. Through testing, the ion conductivity of the foregoing prepared polymer composite membrane Sa16 is 7.5 mS/cm.

Embodiment 17

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

This embodiment is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A self-crosslinking pure acrylic emulsion (which is commercially available from Shanghai Aigao Chemical Co., Ltd. and whose trade mark is 1040), a self-crosslinking pure acrylic emulsion (which is commercially available from Shanghai Aigao Chemical Co., Ltd. and whose trade mark is 1005), and a self-crosslinking styrene acrylic emulsion (which is commercially available from Shanghai Aigao Chemical Co., Ltd. and whose trade mark is S601) whose solid contents are in a mass ratio of 6:1:13 are mixed, an appropriate amount of water is added, and stirring is performed evenly to prepare a bonding layer slurry whose total solid content is 5 wt %.

The foregoing slurry is sprayed onto a surface of the heat-resistant fiber layer of the polymer composite membrane F1 and a side surface of a PTFE plate by using a spraying method (the temperature is 75° C.), and then drying is performed at 50° C., to respectively obtain a polymer composite membrane Sa17 including a bonding layer and a porous self-crosslinking polymer membrane Sb17 on the PTFE plate, where the single-sided surface density of the bonding layer is 0.2 g/m², and the single-sided thickness is 0.3 μm.

Through testing, the porosity of the foregoing prepared porous self-crosslinking polymer membrane Sb17 is 46%, the liquid absorption rate is 220%, and the conductivity is 7.39 mS/cm. Through testing, the ion conductivity of the foregoing prepared polymer composite membrane Sa17 is 7.19 mS/cm.

Embodiment 18

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 11.4:7.6:1 are mixed, and an appropriate amount of water is added, and stirring is performed evenly to prepare a bonding layer slurry whose total solid content is 10 wt %.

The foregoing slurry is printed onto a surface of the heat-resistant fiber layer of the polymer composite membrane F1 and a side surface of a PTFE plate by using a screen-printing method (the temperature is 75° C.), and then drying is performed at 50° C., to respectively obtain a polymer composite membrane Sa18 including a bonding layer and a porous self-crosslinking polymer membrane Sb18 on the PTFE plate, where the single-sided surface density of the bonding layer is 0.3 g/m², and the single-sided thickness is 0.6 μm.

Through testing, the porosity of the foregoing prepared porous self-crosslinking polymer membrane Sb18 is 55%, the liquid absorption rate is 287%, and the conductivity is 7.91 mS/cm. Through testing, the ion conductivity of the foregoing prepared polymer composite membrane Sa18 is 7.81 mS/cm.

Embodiment 19

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A self-crosslinking pure acrylic emulsion (which is commercially available from Shanghai Aigao Chemical Co., Ltd. and whose trade mark is 1040), a copolymer emulsion of vinylidene fluoride and hexafluoropropylene (which is commercially available from Arkema and whose trade mark is 10278), and a self-crosslinking pure acrylic emulsion (which is commercially available from Shanghai Aigao Chemical Co., Ltd. and whose trade mark is 1005) whose solid contents are in a mass ratio of 9.5:9.5:1 are mixed, and an appropriate amount of water is added, and stirring is performed evenly to prepare a bonding layer slurry whose total solid content is 1 wt %.

The foregoing slurry is sprayed onto a surface of the heat-resistant fiber layer of the polymer composite membrane F1 and a side surface of a PTFE plate by using a spraying method (the temperature is 40° C.), and then drying is performed at 50° C., to respectively obtain a polymer composite membrane Sa19 including a bonding layer and a porous self-crosslinking polymer membrane Sb19 on the PTFE plate, where the single-sided surface density of the bonding layer is 0.1 g/m², and the single-sided thickness is 0.2 μm.

Through testing, the porosity of the foregoing prepared porous self-crosslinking polymer membrane Sb19 is 59%, the liquid absorption rate is 252%, and the conductivity is 8.12 mS/cm. Through testing, the ion conductivity of the foregoing prepared polymer composite membrane Sa19 is 8.0 mS/cm.

Embodiment 20

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A copolymer emulsion of vinylidene fluoride and hexafluoropropylene (which is commercially available from Arkema and whose trade mark is 10278) and a self-crosslinking pure acrylic emulsion (which is commercially available from Shanghai Aigao Chemical Co., Ltd. and whose trade mark is 1005) whose solid contents are in a mass ratio of 19:1 are mixed, and an appropriate amount of water is added, and stirring is performed evenly to prepare a bonding layer slurry whose total solid content is 5 wt %.

The foregoing slurry is printed onto a surface of the heat-resistant fiber layer of the polymer composite membrane F1 and a side surface of a PTFE plate by using a screen-printing method (the temperature is 75° C.), and then drying is performed at 50° C., to respectively obtain a polymer composite membrane Sa20 including a bonding layer and a porous self-crosslinking polymer membrane Sb20 on the PTFE plate, where the single-sided surface density of the bonding layer is 0.2 g/m², and the single-sided thickness is 0.4 μm.

Through testing, the porosity of the foregoing prepared porous self-crosslinking polymer membrane Sb20 is 54%, the liquid absorption rate is 76%, and the conductivity is 7.86 mS/cm. Through testing, the ion conductivity of the foregoing prepared polymer composite membrane Sa20 is 7.6 mS/cm.

Embodiment 21

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer:

A copolymer emulsion of vinylidene fluoride and hexafluoropropylene (which is commercially available from Arkema and whose trade mark is 10278) and a self-crosslinking pure acrylic emulsion (which is commercially available from Shanghai Aigao Chemical Co., Ltd. and whose trade mark is 1005) whose solid contents are in a mass ratio of 18:2 are mixed, and an appropriate amount of water is added, and stirring is performed evenly to prepare a bonding layer slurry whose total solid content is 10 wt %.

The foregoing slurry is sprayed onto a surface of the heat-resistant fiber layer of the polymer composite membrane F1 and a side surface of a PTFE plate by using a spraying method (the temperature is 58° C.), and then drying is performed at 50° C., to respectively obtain a polymer composite membrane Sa21 including a bonding layer and a porous self-crosslinking polymer membrane Sb21 on the PTFE plate, where the single-sided surface density of the bonding layer is 0.3 g/m$^2$, and the single-sided thickness is 0.6 μm.

Through testing, the porosity of the foregoing prepared porous self-crosslinking polymer membrane Sb21 is 47%, the liquid absorption rate is 112%, and the conductivity is 7.4 mS/cm. Through testing, the ion conductivity of the foregoing prepared polymer composite membrane Sa21 is 7.3 mS/cm.

Embodiment 22

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer: with reference to Embodiment 1, a difference is in that, the bonding layer slurry further contains a copolymer emulsion of acrylonitrile and acrylate (which is commercially available from Shanghai Aigao Chemical Co., Ltd. and whose trade mark is A1030, where a polyacrylonitrile chain segment accounts for 15 wt %, a polybutyl acrylate chain segment accounts for 30 wt %, a polymethyl methacrylate chain segment accounts for 45 wt %, a polyethylene acrylate chain segment accounts for 5 wt %, a polyacrylic acid chain segment accounts for 5 wt %, the glass transition temperature Tg=28° C., and the solid content is 50 wt %), and a weight ratio of the solid content of A1030 to the total solid content of 1040 and 1005 is 1:1.

The bonding layer slurry is sprayed onto a surface of the heat-resistant fiber layer of the polymer composite membrane F1 and a side surface of a PTFE plate by using a spraying method (the temperature is 40° C.), and then drying is performed at 50° C., to respectively obtain a polymer composite membrane Sa22 including a bonding layer and a porous self-crosslinking polymer membrane Sb22 on the PTFE plate, where the single-sided surface density of the bonding layer is 0.1 g/m$^2$, and the single-sided thickness is 0.2 μm.

Through testing, the porosity of the foregoing prepared porous self-crosslinking polymer membrane Sb22 is 48%, the liquid absorption rate is 293%, and the conductivity is 7.88 mS/cm. Through testing, the ion conductivity of the foregoing prepared polymer composite membrane Sa22 is 7.7 mS/cm.

Embodiment 23

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer: with reference to Embodiment 1, a difference is in that, the bonding layer slurry further contains a vinyl chloride-propylene emulsion (which is commercially available from Shanghai Aigao Chemical Co., Ltd. and whose trade mark is C056, where the glass transition temperature Tg=10° C., and the solid content is 45 wt %), and a weight ratio of the solid content of C056 to the total solid content of 1040 and 1005 is 3:1.

The bonding layer slurry is sprayed onto a surface of the heat-resistant fiber layer of the polymer composite membrane F1 and a side surface of a PTFE plate by using a spraying method (the temperature is 40° C.), and then drying is performed at 50° C., to respectively obtain a polymer composite membrane Sa23 including a bonding layer and a porous self-crosslinking polymer membrane Sb23 on the PTFE plate, where the single-sided surface density of the bonding layer is 0.1 g/m$^2$, and the single-sided thickness is 0.2 μm.

Through testing, the porosity of the foregoing prepared porous self-crosslinking polymer membrane Sb23 is 50%, the liquid absorption rate is 214%, and the conductivity is 7.31 mS/cm. Through testing, the ion conductivity of the foregoing prepared polymer composite membrane Sa23 is 7.22 mS/cm.

Embodiment 24

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer: with reference to Embodiment 1, a difference is in that, the bonding layer slurry further contains a vinyl chloride-propylene emulsion (which is commercially available from Shanghai Aigao Chemical Co., Ltd. and whose trade mark is C056, where the glass transition temperature Tg=10° C., and the solid content is 45 wt %), and a weight ratio of the solid content of C056 to the total solid content of 1040 and 1005 is 1:1.

The bonding layer slurry is sprayed onto a surface of the heat-resistant fiber layer of the polymer composite membrane F1 and a side surface of a PTFE plate by using a spraying method (the temperature is 40° C.), and then drying is performed at 50° C., to respectively obtain a polymer composite membrane Sa24 including a bonding layer and a porous self-crosslinking polymer membrane Sb24 on the PTFE plate, where the single-sided surface density of the bonding layer is 0.1 g/m$^2$, and the single-sided thickness is 0.2 μm.

Through testing, the porosity of the foregoing prepared porous self-crosslinking polymer membrane Sb24 is 46%, the liquid absorption rate is 182%, and the conductivity is 7.26 mS/cm. Through testing, the ion conductivity of the foregoing prepared polymer composite membrane Sa24 is 7.3 mS/cm.

Embodiment 25

This embodiment, for preparing a polymer composite membrane of a four-layered structure of PE base membrane-ceramic layer-heat-resistant fiber layer-bonding layer, is used to describe a polymer composite membrane and a method for preparing same provided in the disclosure.

(1) Prepare a ceramic membrane: the same as that in Embodiment 1, and a ceramic membrane C1 is obtained.

(2) Prepare a heat-resistant fiber layer: the same as that in Embodiment 1, and a polymer composite membrane F1 is obtained.

(3) Prepare a bonding layer: with reference to Embodiment 1, a difference is in that, the self-crosslinking pure acrylic emulsion 1005 is replaced with the self-crosslinking pure acrylic emulsion 1020 having same parts by weight.

The bonding layer slurry is printed onto a surface of the heat-resistant fiber layer of the polymer composite membrane F1 and a side surface of a PTFE plate by using a screen-printing method (the temperature is 75° C.), and then drying is performed at 50° C., to respectively obtain a polymer composite membrane Sa25 including a bonding layer and a porous self-crosslinking polymer membrane Sb25 on the PTFE plate, where the single-sided surface density of the bonding layer is 0.2 g/m$^2$, and the single-sided thickness is 0.4 μm.

Through testing, the porosity of the foregoing prepared porous self-crosslinking polymer membrane Sb25 is 47%, the liquid absorption rate is 160%, and the conductivity is 7.16 mS/cm. Through testing, the ion conductivity of the foregoing prepared polymer composite membrane Sa25 is 7.02 mS/cm.

Embodiment 26

This embodiment, for preparing a polymer composite membrane of a six-layered structure of second bonding layer-second ceramic layer-PE base membrane-first ceramic layer-first heat-resistant fiber layer-first bonding layer, is used to describe a polymer composite membrane and a method for preparing same provided in the disclosure.

(1) Prepare a ceramic membrane: with reference to the method for forming a ceramic layer in Embodiment 1, a first ceramic layer (whose thickness is 1.25 μm) is first formed on a first surface of a PE base membrane; and then a second ceramic layer (whose thickness is 1.25 μm) is formed on the PE base membrane by using the same method, to form a ceramic membrane C9.

(2) Prepare a heat-resistant fiber layer: with reference to the method for forming a heat-resistant fiber layer in Embodiment 1, a first heat-resistant fiber layer (whose thickness is 3 μm) is formed on a surface of the first heat-resistant fiber layer of the foregoing prepared ceramic membrane C9, to obtain a polymer composite membrane F14. Through testing, the transverse stretching strength and the longitudinal stretching strength of the polymer composite membrane F14 are respectively 117 Mpa and 122 MPa, the needling strength is 0.53 kgf, and the ion conductivity is 7.8 mS/cm. Moreover, the polymer composite membrane F14 is baked for 1 h at 120° C., 140° C., 160° C., and 180° C., transverse thermal shrinkage percentages are respectively: 0%, 0%, 1.2%, and 3.5%, and longitudinal thermal shrinkage percentages are respectively: 0%, 0.05%, 2.2%, and 5%.

(3) Prepare a bonding layer: with reference to the method for forming a bonding layer in Embodiment 1, a first bonding layer (whose thickness is 0.1 μm) is first formed on a surface of the first heat-resistant fiber layer of the foregoing prepared polymer composite membrane F14; and then a second bonding layer (whose thickness is 0.1 μm) is formed on a surface of the second ceramic layer of the polymer composite membrane F14, to obtain a polymer composite membrane Sa26. Through testing, the ion conductivity of the foregoing prepared polymer composite membrane Sa26 is 8.35 mS/cm.

Embodiment 27

This embodiment, for preparing a polymer composite membrane of a seven-layered structure of second bonding layer-second heat-resistant fiber layer-second ceramic layer-PE base membrane-first ceramic layer-first heat-resistant fiber layer-first bonding layer, is used to describe a polymer composite membrane and a method for preparing same provided in the disclosure.

(1) Prepare a ceramic membrane: the same as that in Embodiment 14, and a ceramic membrane C9 is formed.

(2) Prepare a heat-resistant fiber layer: with reference to the method for forming a heat-resistant fiber layer in Embodiment 1, a first heat-resistant fiber layer (whose thickness is 1.5 μm) is first formed on a surface of the first ceramic layer of the foregoing prepared ceramic membrane C9; and then a second heat-resistant fiber layer (whose thickness is 1.5 μm) is formed on a surface of the second ceramic layer of the ceramic membrane C9, to obtain a polymer composite membrane F15. Through testing, the transverse stretching strength and the longitudinal stretching strength of the polymer composite membrane F15 are respectively 115 Mpa and 121 MPa, the needling strength is 0.53 kgf, and the ion conductivity is 7.8 mS/cm. Moreover, the polymer composite membrane F15 is baked for 1 h at 120° C., 140° C., 160° C., and 180° C., transverse thermal shrinkage percentages are respectively: 0%, 0%, 1%, and 3.2%, and longitudinal thermal shrinkage percentages are respectively: 0%, 0.04%, 2% and, 4.5%.

(3) Prepare a bonding layer: with reference to the method for forming a bonding layer in Embodiment 1, a first bonding layer (whose thickness is 0.1 μm) is first formed on a surface of the first heat-resistant fiber layer of the foregoing prepared polymer composite membrane F15; and then a second bonding layer (whose thickness is 0.1 μm) is formed on a surface of the second heat-resistant fiber layer of the polymer composite membrane F15, to obtain a polymer composite membrane Sa27. Through testing, the ion conductivity of the foregoing prepared polymer composite membrane Sa27 is 8.37 mS/cm.

The implementations of the disclosure are described in detail above. However, the disclosure is not limited to specific details in the foregoing implementations. Within the scope of the technical idea of the disclosure, a plurality of simple variances may be performed on the technical solutions of the disclosure, and these simple variances all fall within the protection scope of the disclosure.

In addition, it should be noted that, specific technical features described in the foregoing specific implementations may be combined in any appropriate manner without conflict. To avoid unnecessary repetition, various possible combination manners are not further described in the disclosure.

Moreover, various different implementations of the disclosure may also be randomly combined with each other. Provided that the combination does not depart from the idea of the disclosure, the combination should be similarly considered as the content disclosed in the disclosure.

What is claimed is:

1. A polymer composite membrane, comprising:
a polymer base membrane;
a first ceramic layer;
a first heat-resistant fiber layer; and
a first bonding layer,
wherein:
the polymer base membrane comprises a first surface and a second surface disposed opposite to each other;
the polymer base membrane, the first ceramic layer, the first heat-resistant fiber layer, and the first bonding layer are stacked sequentially;
materials of the first heat-resistant fiber layer are a mixture of a first polymeric material and a second polymeric material;
the first polymeric material is a heat-resistant polymeric material whose melting point is above 180° C.; and
a melting point of the second polymeric material is lower than that of the first polymeric material, and a liquid absorption rate of the second polymeric material in an electrolyte at 25° C. is above 40% and has an error of ±5%;
the first bonding layer contains an acrylate crosslinked polymer, a styrene-acrylate crosslinked copolymer and a vinylidene fluoride-hexafluoropropylene copolymer, or the first bonding layer contains an acrylate crosslinked polymer and a styrene-acrylate crosslinked copolymer, or the first bonding layer contains an acrylate crosslinked polymer and a vinylidene fluoride-hexafluoropropylene copolymer, and the porosity of the first bonding layer is 40% to 65%; and
the glass transition temperature of the acrylate crosslinked polymer is −20° C. to 60° C., the glass transition temperature of the styrene-acrylate crosslinked copolymer is −30° C. to 50° C., and the glass transition temperature of the vinylidene fluoride-hexafluoropropylene copolymer is −65° C. to −40° C.

2. The polymer composite membrane according to claim 1, wherein a liquid absorption rate of the first polymeric material in an electrolyte at 25° C. is below 5% and has an error of ±5%; and
the glass transition temperature of the first polymeric material is above 100° C.; the melting point of the second polymeric material is 100° C. to 150° C.; and the glass transition temperature of the second polymeric material is below 25° C.

3. The polymer composite membrane according to claim 1, wherein a weight ratio of the first polymeric material to the second polymeric material in the first heat-resistant fiber layer is (0.5 to 10):1.

4. The polymer composite membrane according to claim 1, wherein
the first polymeric material is selected from one or more of polyetherimide, poly (ether ether ketone), polyether sulfone, polyamide-imide, polyamide acid, and polyvinylpyrrolidone; and
the second polymeric material is selected from one or more of modified polyvinylidene fluoride, polyacrylate, polyphenyl ethylene, and polyethylene oxide; optionally, the modified polyvinylidene fluoride is polyvinylidene fluoride-hexafluoropropylene; and the polyacrylate is one or more of polymethyl acrylate, polyethylene acrylate, and polymethyl methacrylate.

5. The polymer composite membrane according to claim 4, wherein the first polymeric material is polyetherimide, and the second polymeric material is polyvinylidene fluoride-hexafluoropropylene; and
the materials of the first heat-resistant fiber layer are a mixture of polyetherimide and polyvinylidene fluoride-hexafluoropropylene.

6. The polymer composite membrane according to claim 1, wherein the diameter of fiber in the first heat-resistant fiber layer is 100 nm to 2000 nm, and the thickness of the first heat-resistant fiber layer is 0.5 μm to 30 μm; and the first heat-resistant fiber layer has a porosity of 75% to 93% and has a surface density of 0.2 g/m² to 15 g/m².

7. The polymer composite membrane according to claim 1, wherein
the first bonding layer contains the acrylate crosslinked polymer and the styrene-acrylate crosslinked copolymer and does not contain the vinylidene fluoride-hexafluoropropylene copolymer, and a weight ratio of the acrylate crosslinked polymer to the styrene-acrylate crosslinked copolymer is 1:(0.05 to 2); or
the first bonding layer contains the acrylate crosslinked polymer and the vinylidene fluoride-hexafluoropropylene copolymer and does not contain the styrene-acrylate crosslinked copolymer, and a weight ratio of the acrylate crosslinked polymer to the vinylidene fluoride-hexafluoropropylene copolymer is 1:(0.3 to 25); or
the first bonding layer contains the acrylate crosslinked polymer, the styrene-acrylate crosslinked copolymer, and the vinylidene fluoride-hexafluoropropylene copolymer, and a weight ratio between the acrylate crosslinked polymer, the styrene-acrylate crosslinked copolymer and the vinylidene fluoride-hexafluoropropylene copolymer is 1:(0.01 to 2):(0.3 to 5).

8. The polymer composite membrane according to claim 1, wherein the acrylate crosslinked polymer is a mixture of a first acrylate crosslinked polymer and a second acrylate crosslinked polymer and a third acrylate crosslinked polymer, or the acrylate crosslinked polymer is a mixture of a first acrylate crosslinked polymer and a second acrylate crosslinked polymer, or the acrylate crosslinked polymer is a mixture of a first acrylate crosslinked polymer and a third acrylate crosslinked polymer, or the acrylate crosslinked polymer is a second acrylate crosslinked polymer, or the acrylate crosslinked polymer is a third acrylate crosslinked polymer, wherein
the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %/o, and a polyacrylic acid chain segment of 2 to 10 wt %; the glass transition temperature of the first acrylate crosslinked polymer is 50° C. to 60° C., the glass transition temperature of the second acrylate crosslinked polymer is −20° C. to −5° C., and the glass transition temperature of the third acrylate crosslinked polymer is 30° C. to 50° C.;

the styrene-acrylate crosslinked copolymer contains a polyphenyl ethylene chain segment of 40 to 50 wt/o, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; and the glass transition temperature of the styrene-acrylate crosslinked copolymer is 15° C. to 30° C.; and the vinylidene fluoride-hexafluoropropylene copolymer contains a polyvinylidene fluoride chain segment of 80 to 98 wt % and a polyhexafluoropropylene chain segment of 2 to 20 wt %; and the glass transition temperature of the vinylidene fluoride-hexafluoropropylene copolymer is −60° C. to −40° C.

9. The polymer composite membrane according to claim 1, wherein the first bonding layer contains a first acrylate crosslinked polymer, a second acrylate crosslinked polymer, and the styrene-acrylate crosslinked copolymer and does not contain the vinylidene fluoride-hexafluoropropylene copolymer, and a weight ratio between the first acrylate crosslinked polymer, the second acrylate crosslinked polymer and the styrene-acrylate crosslinked copolymer is (5 to 10):1:(10 to 13), or the first bonding layer contains the first acrylate crosslinked polymer, the second acrylate crosslinked polymer, and the vinylidene fluoride-hexafluoropropylene copolymer and does not contain the styrene-acrylate crosslinked copolymer, and a weight ratio between the first acrylate crosslinked polymer, the second acrylate crosslinked polymer and the vinylidene fluoride-hexafluoropropylene copolymer is (5 to 15):1:(5 to 12); or the first bonding layer contains the second acrylate crosslinked polymer and the vinylidene fluoride-hexafluoropropylene copolymer and does not contain the styrene-acrylate crosslinked copolymer, and a weight ratio of the second acrylate crosslinked polymer to the vinylidene fluoride-hexafluoropropylene copolymer is 1:(5 to 20); or the first bonding layer contains the second acrylate crosslinked polymer, the styrene-acrylate crosslinked copolymer, and the vinylidene fluoride-hexafluoropropylene copolymer, and a weight ratio between the second acrylate crosslinked polymer, the styrene-acrylate crosslinked copolymer and the vinylidene fluoride-hexafluoropropylene copolymer is 1:(0.5 to 2):(1 to 5); or the first bonding layer contains a third acrylate crosslinked polymer, the styrene-acrylate crosslinked copolymer, and the vinylidene fluoride-hexafluoropropylene copolymer, and a weight ratio between the third acrylate crosslinked polymer, the styrene-acrylate crosslinked copolymer and the vinylidene fluoride-hexafluoropropylene copolymer is 1:(0.5 to 2):(1 to 5); or the first bonding layer contains the first acrylate crosslinked polymer, the second acrylate crosslinked polymer, the styrene-acrylate crosslinked copolymer, and the vinylidene fluoride-hexafluoropropylene copolymer, and a weight ratio between the first acrylate crosslinked polymer, the second acrylate crosslinked polymer, the styrene-acrylate crosslinked copolymer and the vinylidene fluoride-hexafluoropropylene copolymer is (10 to 15):1:(0.5 to 2):(5 to 10), wherein the first acrylate crosslinked polymer contains a polymethyl methacrylate chain segment of 70 to 80 wt %, a polyethylene acrylate chain segment of 2 to 10 wt %, a polybutyl acrylate chain segment of 10 to 20 wt %, and a polyacrylic acid chain segment of 2 to 10 wt %, the second acrylate crosslinked polymer contains a polymethyl methacrylate chain segment of 30 to 40 wt %, a polyethylene acrylate chain segment of 2 to 10 wt %, a polybutyl acrylate chain segment of 50 to 60 wt %, and a polyacrylic acid chain segment of 2 to 10 wt %, and the third acrylate crosslinked polymer contains a polymethyl methacrylate chain segment of 50 to 80 wt %, a polyethylene acrylate chain segment of 2 to 10 wt %, a polybutyl acrylate chain segment of 15 to 40 wt %, and a polyacrylic acid chain segment of 2 to 10 wt %; the styrene-acrylate crosslinked copolymer contains a polyphenyl ethylene chain segment of 40 to 50 wt %, a polymethyl methacrylate chain segment of 5 to 15 wt %, a polyethylene acrylate chain segment of 2 to 10 wt %, a polybutyl acrylate chain segment of 30 to 40 wt %, and a polyacrylic acid chain segment of 2 to 10 wt %; the vinylidene fluoride-hexafluoropropylene copolymer contains a polyvinylidene fluoride chain segment of 80 to 98 wt % and a polyhexafluoropropylene chain segment of 2 to 20 wt %; and the glass transition temperature of the first acrylate crosslinked polymer is 50° C. to 60° C., the glass transition temperature of the second acrylate crosslinked polymer is −20° C. to −5° C., the glass transition temperature of the third acrylate crosslinked polymer is 30° C. to 50° C., the glass transition temperature of the styrene-acrylate crosslinked copolymer is 15° C. to 30° C., and the glass transition temperature of the vinylidene fluoride-hexafluoropropylene copolymer is −60° C. to −40° C.

10. The polymer composite membrane according to claim 1, wherein the first bonding layer further contains at least one of an acrylonitrile-acrylate copolymer, a vinyl chloride-propylene copolymer, and a butadiene-styrene copolymer;

when the first bonding layer further contains the acrylonitrile-acrylate copolymer, a weight ratio of the acrylonitrile-acrylate copolymer to the acrylate crosslinked polymer is (0.05 to 2):1;

when the first bonding layer further contains the vinyl chloride-propylene copolymer, a weight ratio of the vinyl chloride-propylene copolymer to the acrylate crosslinked polymer is (0.15 to 7):1; and when the first bonding layer further contains the butadiene-styrene copolymer, a weight ratio of the butadiene-styrene copolymer to the acrylate crosslinked polymer is (0.05 to 2):1.

11. The polymer composite membrane according to claim 1, wherein the single-sided surface density of the first bonding layer is 0.05 mg/cm$^2$ to 0.9 mg/cm$^2$; and the single-sided thickness of the first bonding layer is 0.1 μm to 1 μm.

12. The polymer composite membrane according to claim 1, wherein the polymer composite membrane further comprises a second ceramic layer and a second bonding layer disposed sequentially from inside out on the second surface of the polymer base membrane, the second ceramic layer is the same as or different from the first ceramic layer, and the second bonding layer is the same as or different from the first bonding layer; and the polymer composite membrane is formed by the second bonding layer, the second ceramic layer, the polymer base membrane, the first ceramic layer, the first heat-resistant fiber layer, and the first bonding layer stacked sequentially.

13. The polymer composite membrane according to claim 1, wherein the polymer composite membrane further comprises a second ceramic layer, a second heat-resistant fiber layer, and a second bonding layer disposed sequentially from inside out on the second surface of the polymer base membrane, the second ceramic layer is the same as or different from the first ceramic layer, the second heat-resistant fiber layer is the same as or different from the first heat-resistant fiber layer, and the second bonding layer is the same as or different from the first bonding layer; and the polymer composite membrane is formed by the second bonding layer, the second heat-resistant fiber layer, the second ceramic layer, the polymer base membrane, the first ceramic layer, the first heat-resistant fiber layer, and the first bonding layer stacked sequentially.

14. A lithium-ion battery, comprising a positive electrode, a negative electrode, and a battery membrane located between the positive electrode and the negative electrode, wherein the battery membrane is the polymer composite membrane according to claim 1.

* * * * *